US011891590B2

(12) United States Patent
Yamashita et al.

(10) Patent No.: US 11,891,590 B2
(45) Date of Patent: Feb. 6, 2024

(54) DETERGENT FOR CORNEUM-DERIVED STAINS, AND METHOD FOR EVALUATING ABILITY TO DEGRADE CORNEUM-DERIVED STAINS

(71) Applicant: Kao Corporation, Tokyo (JP)

(72) Inventors: Daichi Yamashita, Utsunomiya (JP); Takahiro Hioki, Wakayama (JP); Masatoshi Tohata, Utsunomiya (JP)

(73) Assignee: Kao Corporation, Tokyo (JP)

( * ) Notice: Subject to any disclaimer, the term of this patent is extended or adjusted under 35 U.S.C. 154(b) by 870 days.

(21) Appl. No.: 16/961,796

(22) PCT Filed: Jan. 15, 2019

(86) PCT No.: PCT/JP2019/000895
§ 371 (c)(1),
(2) Date: Jul. 13, 2020

(87) PCT Pub. No.: WO2019/142774
PCT Pub. Date: Jul. 25, 2019

(65) Prior Publication Data
US 2021/0071114 A1 Mar. 11, 2021

(30) Foreign Application Priority Data

Jan. 16, 2018 (JP) .................... 2018-005193
Jan. 16, 2018 (JP) .................... 2018-005194

(51) Int. Cl.
| | |
|---|---|
| C11D 3/386 | (2006.01) |
| D06L 1/00 | (2017.01) |
| D06L 1/12 | (2006.01) |
| C12N 9/50 | (2006.01) |
| C12N 9/52 | (2006.01) |
| C12N 9/54 | (2006.01) |
| C11D 11/00 | (2006.01) |

(52) U.S. Cl.
CPC ...... *C11D 3/38618* (2013.01); *C11D 11/0017* (2013.01); *C12Y 304/21014* (2013.01)

(58) Field of Classification Search
None
See application file for complete search history.

(56) References Cited

U.S. PATENT DOCUMENTS

| | | | |
|---|---|---|---|
| 6,156,557 A | 12/2000 | Moriyama et al. | |
| 2005/0059112 A1* | 3/2005 | Estell ............ | A23K 20/189 435/320.1 |
| 2006/0147499 A1 | 7/2006 | Oestergaard et al. | |
| 2016/0108387 A1 | 4/2016 | Babe et al. | |
| 2016/0312156 A1* | 10/2016 | Pan ............ | C11D 3/3947 |
| 2019/0284511 A1 | 9/2019 | Oehlenschlaeger et al. | |
| 2021/0071114 A1 | 3/2021 | Yamashita et al. | |

| | | |
|---|---|---|
| 2021/0207116 A1 | 7/2021 | Hioki et al. |
| 2021/0261886 A1 | 8/2021 | Oehlenschlaeger et al. |
| 2021/0284934 A1 | 9/2021 | Oehlenschlaeger et al. |

FOREIGN PATENT DOCUMENTS

| | | |
|---|---|---|
| CN | 1774504 A | 5/2006 |
| CN | 105452456 A | 3/2016 |
| CN | 106414732 A | 2/2017 |
| CN | 109415665 A | 3/2019 |
| CN | 111601894 A | 8/2020 |
| JP | H04-108387 A | 4/1992 |
| JP | H09-121855 A | 5/1997 |
| JP | H10-501577 A | 2/1998 |
| JP | H11-279600 A | 10/1999 |
| JP | 2000-060547 A | 2/2000 |
| JP | 2003-41479 A | 2/2003 |
| JP | 2003-116563 A | 4/2003 |
| JP | 2004-527603 A | 9/2004 |
| JP | 2005-132898 A | 5/2005 |
| JP | 2015-120849 A | 7/2015 |
| JP | 2017-095610 A | 6/2017 |

(Continued)

OTHER PUBLICATIONS

Hui-Lin Zhao, "Bacteriolytic and elastolytic mechanism of a novel M23 metalloprotease pseudalterin from deep-sea and its function in ecology and antimicrotial therapy," Shandong University Doctoral Dissertation, China Doctoral Dissertations Full-text database (CDFD), Basic Science, issued on Sep. 15, 2013, 192 pages.

Hioki, Takahiro et al., "Heterologous production of active form of beta-lytic protease by *Bacillus subtilis* and improvement of staphylolytic activity by protein engineering, " Microbial Cell Factories, vol. 20, No. 231, 13 pages, Dec. 28, 2021.

Zhao Hui-Lin, et al., "Elastolytic mechanism of a novel M23 metalloprotease pseudoalterin from deep-sea *Pseudoalteromonas* sp. CF6-2: cleaving not only glycyl bonds in the hydrophobic regions but also peptide bonds in the hydrophilic regions involved in cross-linking," J Biol Chem. Nov. 16, 2012;287(47):39710-20. doi:10.1074/jbc.M112.405076. Epub Sep. 25, 2012. PMID: 23012370; PMCID: PMC3501066.

International Search Report for PCT/JP2019/000895; I.A. fd Jan. 15, 2019, dated Mar. 19, 2019, from the Japan Patent Office, Tokyo, Japan.

(Continued)

*Primary Examiner* — Lorna M Douyon
(74) *Attorney, Agent, or Firm* — Sterne, Kessler, Goldstein & Fox P.L.L.C.

(57) ABSTRACT

Provided is a detergent having a high detergency against corneum-derived stains and a method for evaluating the ability of an enzyme to degrade corneum-derived stains. The detergent a M23A subfamily protease as an active ingredient. The method for evaluating the ability of the enzyme to degrade corneum-derived stains comprises obtaining the degrading activities of the test enzyme on a reference peptide and one or more substrate peptides and evaluating the ability of the test enzyme to degrade corneum-derived stains based on the degrading activities of the test enzyme on the reference peptide and the substrate peptide, wherein the reference peptide is GGGGG or GGGG, the one or more substrate peptides are selected from the group consisting of GGGXG, GXGGG, GGXG, and GXGG, and X is any amino acid residue other than glycine.

16 Claims, 6 Drawing Sheets

Specification includes a Sequence Listing.

(56) References Cited

FOREIGN PATENT DOCUMENTS

| JP | 2019-122300 A | 7/2019 |
|---|---|---|
| JP | 2019-123803 A | 7/2019 |
| JP | 2020-080710 A | 6/2020 |
| WO | WO 95/34627 A1 | 12/1995 |
| WO | WO 02/066591 A1 | 8/2002 |
| WO | WO 2015/158719 A1 | 10/2015 |
| WO | WO 2015/193488 A1 | 12/2015 |
| WO | WO 2017/061283 A1 | 4/2017 |
| WO | WO 2019/142773 A1 | 7/2019 |

OTHER PUBLICATIONS

International Preliminary Report on Patentability (IPRP), Chapter I of the Patent Cooperation Treaty, including the Written Opinion, for PCT/JP2019/000895; I.A. fd Jan. 15, 2019, dated Jul. 21, 2020, by the International Bureau of WIPO, Geneva, Switzerland.

Minagawa, M et al., "Study on washing of the sputum own quality dirt. About a stratum corneum dirt attaching to vesture." J. Japan Research Assoc for Textile End-Uses 16(3):106-115 (1978) (in Japanese).

Minagawa, M et al., "Study on washing of the sputum own quality dirt. About a stratum corneum dirt attaching to vesture." J. Japan Research Assoc for Textile End-Uses 16(3):106-115 (1978) (in English).

Candi, E. et al., "The cornified envelope: a model of cell death in the skin," Nature Reviews Molecular Cell Biology 6:328-340 (Apr. 2005).

Murata, M et al., "Some facts on residual soils on home-laundered dress shirt collars," J. Jpn. Oil Chem. Cos. (Yukagaku 42(1):2-9 (1993).

Katagata, Y, "General remarks, biochemistry of the ceratin protein. To structure, a function and a gene." Protein, Nucleic Acid, Enzyme. 38(16):2711-2722 (1993) (in Japanese).

Katagata, Y, "General remarks, biochemistry of the ceratin protein to structure, a function and a gene." Protein, Nucleic Acid, Enzyme. 38(16):2711-2722 (1993) (in English).

Spencer, J et al., "Crystal structure of the LasA virulence factor from *Pseudomonas aeruginosa*: substrate specificity and mechanism of M23 metallopeptidases." J Mol Biol. 2010;396(4):908-923. doi:10.1016/j.jmb.2009.12.021.

Loewy, AG et al., "Purification and characterization of a novel zinc-proteinase from cultures of *Aeromonas hydrophila*." J Biol Chem. 1993;268(12):9071-9078.

Gökçen, A et al., "Biofilm-degrading enzymes from *Lysobacter gummosus*." Virulence. 2014;5(3):378-387. doi:10.4161/viru.27919 including the Supplemental Material.

"Beta-lytic metalloendopeptidase," UniProtKB, Feb. 17, 2016, accession No. A0A0S2FCI9_9GAMM, printed Mar. 12, 2019 from www.uniprot.org/uniprot/A0A0S2FCI9.

The extended European Search Report, including the supplementary European search report and the European search opinion, for EP Application No. 19741861.9, dated Nov. 23, 2021, European Patent Office, Munich, Germany.

\* cited by examiner

[Figure 1]
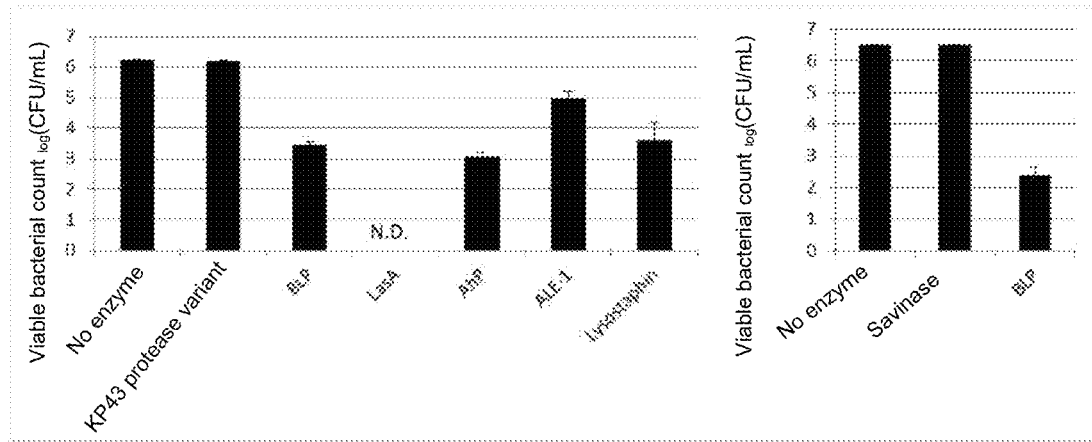
[Figure 2]
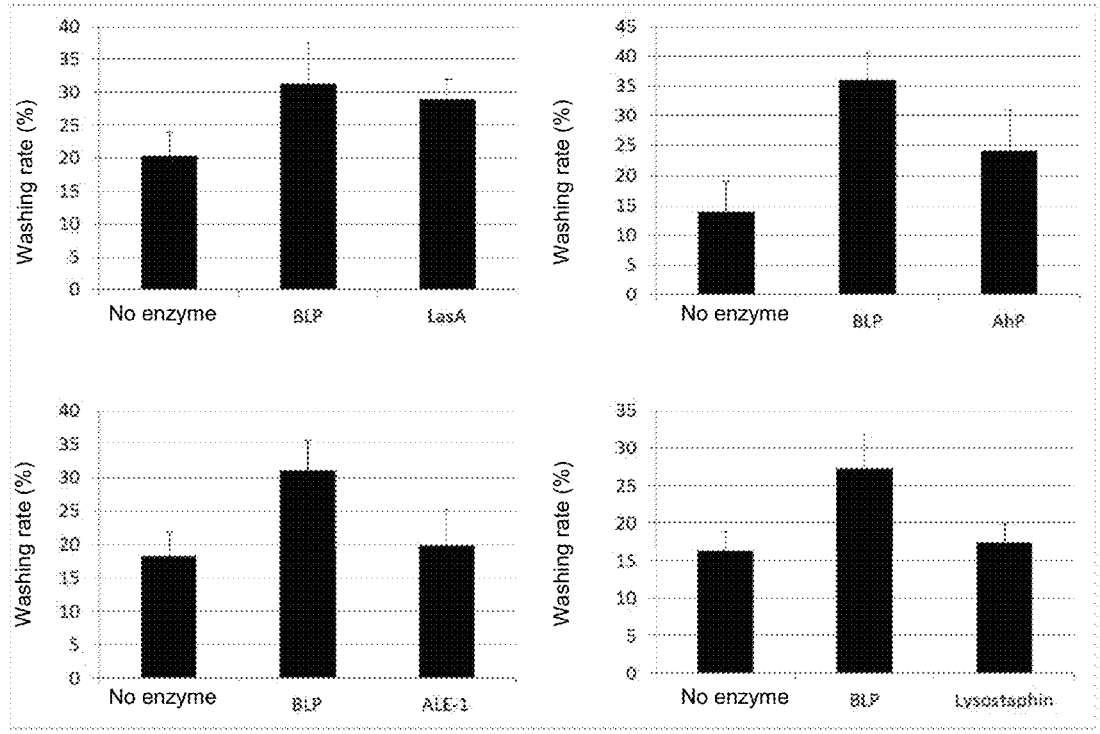

[Figure 3]
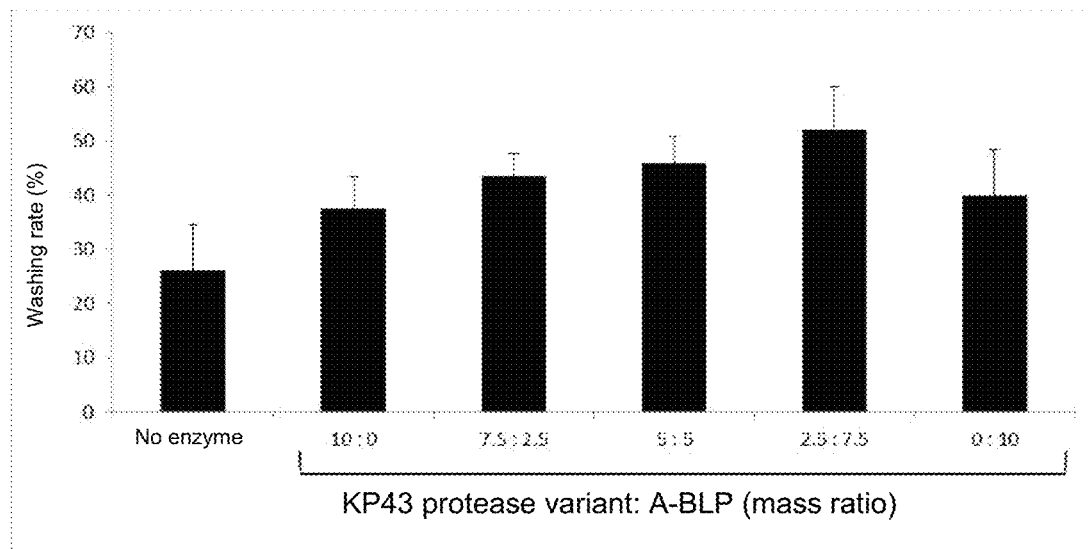
[Figure 4]
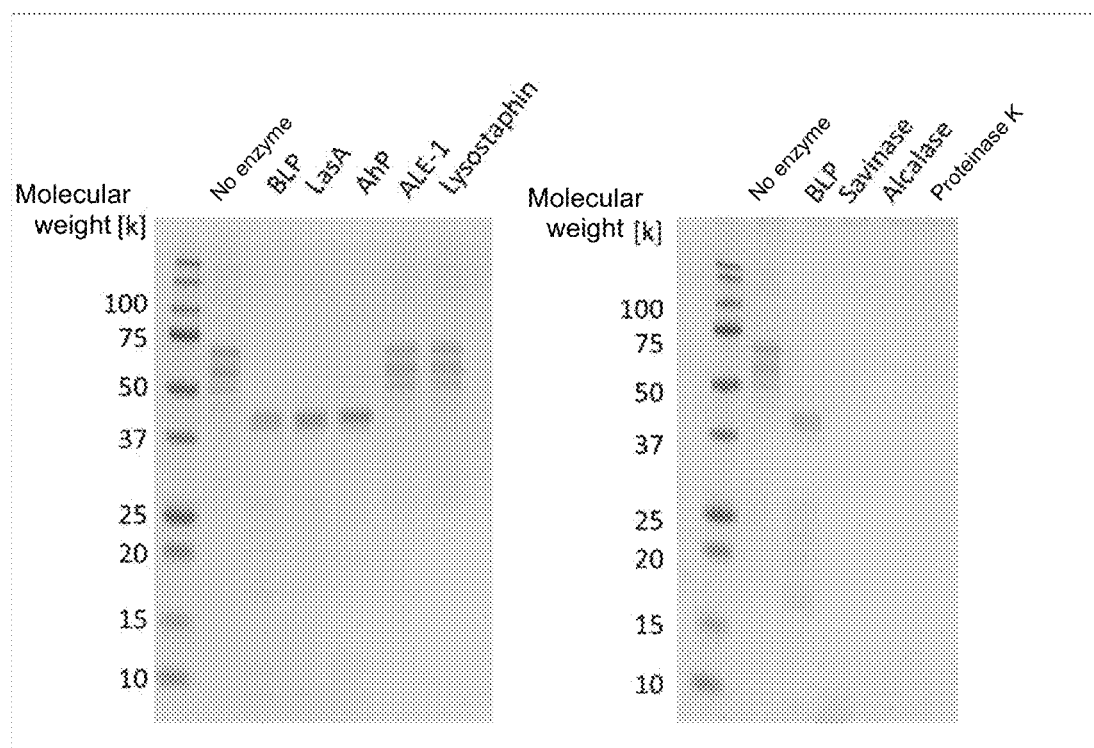

[Figure 5]
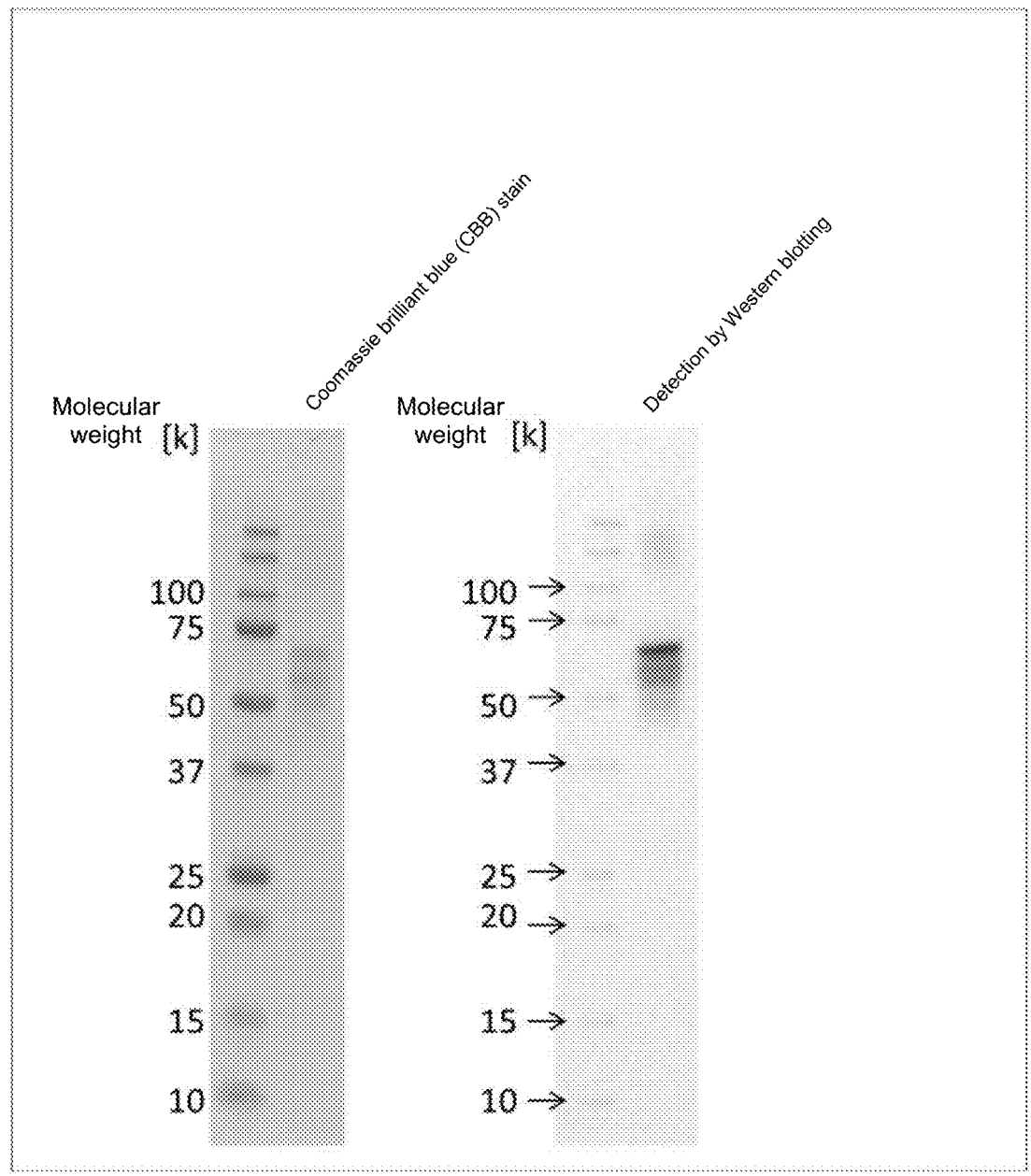

[Figure 6]

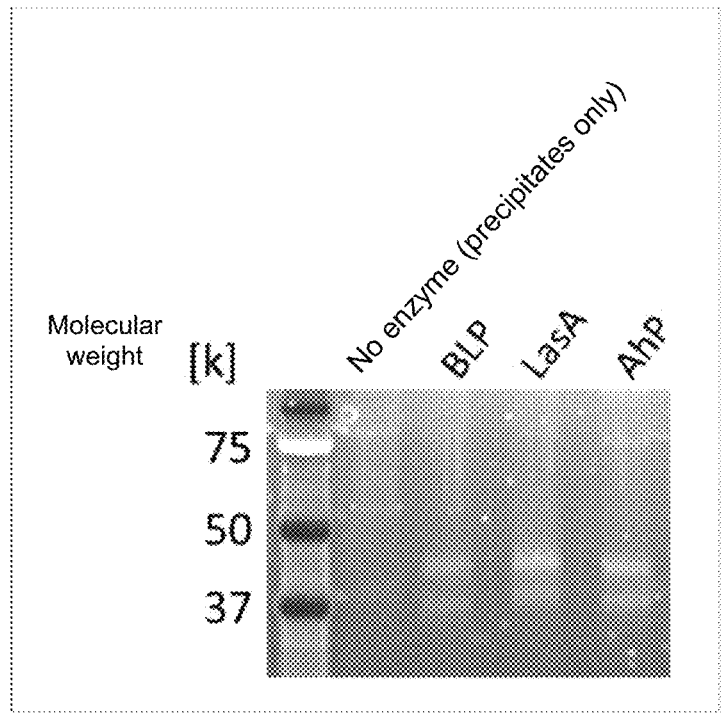

[Figure 7]

```
MSVRYSSSKHYSSSRSGGGGGGGGCGGGGGVSSLRISSSKGSLGGGFSSGGFSG
GSFSRGSSGGGCFGGSSGGYGGLGGFGGGSFRGSYGSSSFGGSYGGSFGGGSF
GGGSFGGGSFGGGGFGGGGFGGGFGGGFGGDGGLLSGNEKVTMQNLNDRLASY
LDKVRALEESNYELEGKIKEWYEKHGNSHQGEPRDYSKYYKTIDDLKNQILNLTTDN
ANILLQIDNARLAADDFRLKYENEVALRQSVEADINGLRRVLDELTLTKADLEMQIESL
TEELAYLKKNHEEEMKDLRNVSTGDVNVEMNAAPGVDLTQLLNNMRSQYEQLAEQ
NRKDAEAWFNEKSKELTTEIDNNIEQISSYKSEITELRRNVQALEIELQSQLALKQSL
EASLAETEGRYCVQLSQIQAQISALEEQLQQIRAETECQNTEYQQLLDIKIRLENEIQT
YRSLLEGEGSSGGGGRGGGSFGGGYGGGSSGGGSSGGGYGGHGGSSGGGYG
GGSSGGGSSGGGYGGGSSSGGHGGSSSGGYGGGSSGGGGGGYGGGSSGGGS
SSGGGYGGGSSSGGHKSSSSGSVGESSSKGPRY
```

[Figure 8]
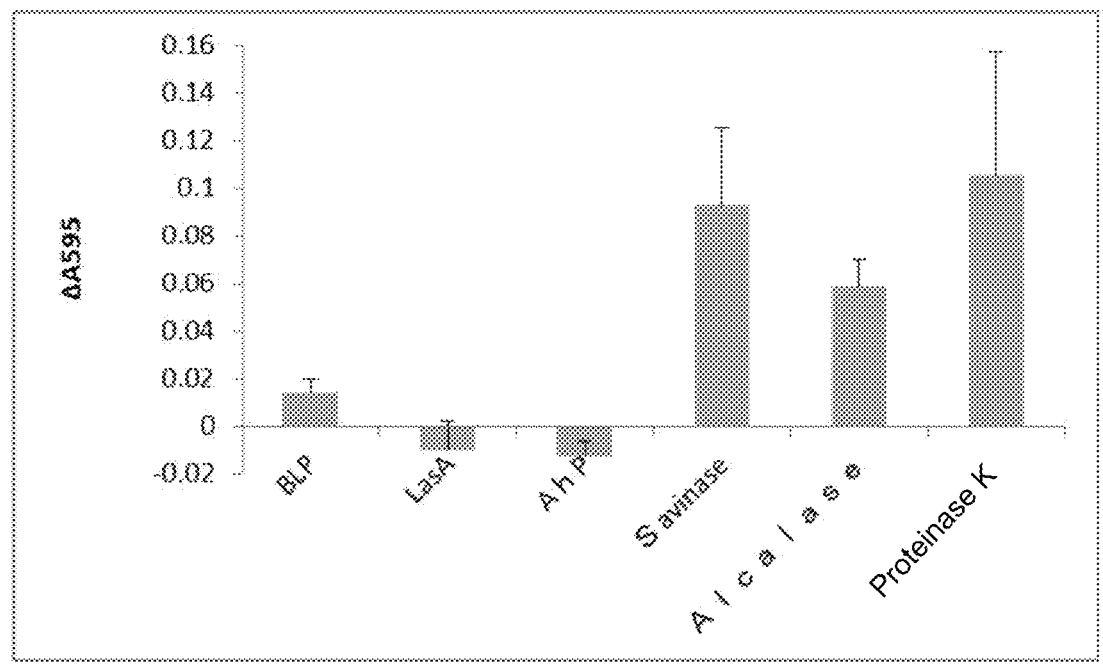
[Figure 9]
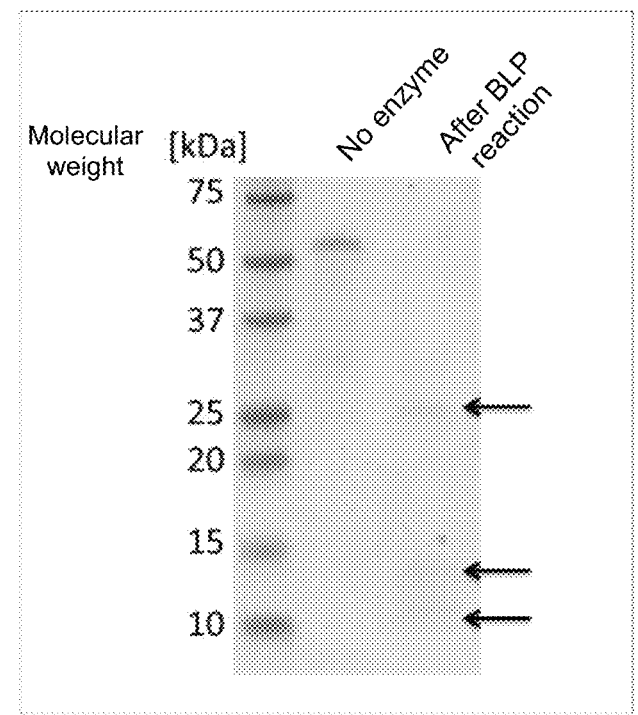

[Figure 10]

```
MSYQKKQPTPQPPVDCVKTSGGGGGGGGGGGGCGFFGGGGSGG
GSSGSGCGYSGGGGYSGGGCGGGSSGGGGGGIGGCGGGSGGSVK
YSGGGGSSGGGSGCFSSGGGGSGCFSSGGGGSSGGGSGCFSSGGGG
SSGGGSGCFSSGGGGFSGQAVQCQSYGGVSSGGSSGGGSGCFSSGG
GGGSVCGYSGGGSGGGSGCGGGSSGGSGSGYVSSQQVTQTSCAPQP
SYGGGSSGGGGSGGSGCFSSGGGGGSSGCGGGSSGIGSGCIISGGGS
VCGGGSSGGGGGGSSVGGSGSGKGVPICHQTQQKQAPTWPSK
```

DETERGENT FOR CORNEUM-DERIVED STAINS, AND METHOD FOR EVALUATING ABILITY TO DEGRADE CORNEUM-DERIVED STAINS

FIELD OF THE INVENTION

The present invention relates to a detergent for corneum-derived stains, a washing method using the detergent, and a method for evaluating the ability of an enzyme or a composition containing the enzyme to degrade corneum-derived stains.

BACKGROUND OF THE INVENTION

In the skin, cells undergoing cell division in the basal layer are differentiated while moving towards the outer layer, enucleated in the outermost layer, and then multilayered to form a stratum corneum. The stratum corneum of the skin functions as a barrier, which is an important function of the skin. The turnover of the stratum corneum is approximately 28 days in humans, and the stratum corneum or components thereof become scurf after finishing the role.

Among stains attached to clothes, black-brown color stains on the collar, cuffs, and the like of a dress shirt or the like are called "collar and cuff stains," "black stains," or the like and are very difficult to be removed. These stains are caused by corneocytes or components thereof in the skin surface layer attached to the clothes. It has been reported that components of the collar and cuff stains include loricrin and keratin 10, which are proteins derived from the stratum corneum (Non-Patent Literatures 1 and 2). It is thought that, among the collar and cuff stains, a particularly tough stain contains a keratin protein derived from the stratum corneum (Non-Patent Literature 3). Keratin 10 and loricrin are proteins having a region with a high ratio of glycine (at both ends of Keratin 10), which is called a glycine-rich region (Non-Patent Literature 4).

Detergents or washing methods targeting these stains caused by proteins derived from the corneocytes (hereinafter also referred to as "corneum-derived stains"), such as so-called collar and cuff stains, have been conventionally developed. Patent Literature 1 discloses a detergent composition containing a specific nonionic surfactant, a sulfonic acid compound, and polyethylene glycol in a specific ratio. Patent Literature 2 discloses a method comprising bringing an object to be washed into contact with a solution containing a chelating agent and water and then bringing it into contact with a solution containing a surfactant, water, and an enzyme. Patent Literature 3 discloses a detergent composition containing a specific nonionic surfactant, a metal ion scavenger, a protease, alkanolamine, a copolymer of (meth)acrylic acid and a (meth)acrylic acid ester, and a hydrotropic agent.

In recent years, detergents containing enzymes which are excellent in proteolysis, such as proteases, have been provided (e.g., Patent Literatures 3 to 5). Proteases are also considered useful to wash collar and cuff stains (Patent Literatures 3 and 4). However, the ability of conventional detergents against corneum-derived stains is not sufficient. To effectively remove collar and cuff stains with a conventional detergent, it is necessary to apply the detergent directly to stains without diluting the detergent with water as in a usual manner and further to wash by rubbing. There is an unmet need for development of a detergent and a protease with a higher detergency against corneum-derived stains such as collar and cuff stains. There is also an unmet need for a convenient method for evaluating the ability of a protease to degrade corneum-derived stains without using human-derived corneum.

However, proteases which are excellent in proteolysis may damage clothes by degrading animal fibers. A protease with a reduced damaging property against wool and silk has been reported (Patent Literature 5). In recent years, with an increased awareness of hygiene among people, there is increasingly higher interest in removal of odor and bacteria from clothes. It is known that indigenous microorganisms in the skin and various microorganisms present in the environment are attached to clothes and propagate, and Gram-positive bacteria, such as *Staphylococcus aureus* and *Micrococcus* bacteria, are known as indigenous microorganisms in the skin (Patent Literatures 6 and 7). So far, it has been reported that a bad odor from the laundry can be reduced using lysostaphin, an enzyme having a bactericidal effect on *Staphylococcus aureus* (Patent Literature 6).

Patent Literature 1: JP-A-11-279600
Patent Literature 2: JP-A-2003-41479
Patent Literature 3: JP-A-2005-132898
Patent Literature 4: JP-A-2015-120849
Patent Literature 5: JP-A-10-501577
Patent Literature 6: JP-A-2004-527603
Patent Literature 7: JP-A-2017-095610
Non Patent Literature 1: Journal of the Japan Research Association for Textile End-Uses, 19(3), 106-115, 1978
Non Patent Literature 2: Nature Reviews Molecular Cell Biology, 6, 328-340, 2005
Non Patent Literature 3: J. Jpn. Oil Chem. Soc. (YUKAGAKU), 42(1), p 2-9, 1993
Non-Patent Literature 4: Protein, Nucleic Acid, Enzyme. 38(16), p 2711-2722, 1993

SUMMARY OF THE INVENTION

In one aspect, the present invention provides a detergent for corneum-derived stains comprising an M23A subfamily protease as an active ingredient.

In another aspect, the present invention provides a method for washing corneum-derived stains comprising using the detergent for corneum-derived stains.

In yet another aspect, the present invention provides a method for evaluating the ability of an enzyme or a composition containing the enzyme to degrade corneum-derived stains, comprising:

measuring degrading activities of a test enzyme or a composition containing the test enzyme on a reference peptide and one or more substrate peptides;

obtaining relative value of the degrading activity on each of the one or more substrate peptides based on the degrading activity on the reference peptide; and selecting the test enzyme or the composition containing the test enzyme having:

specific activity for degrading the reference peptide being U/mg or higher and the relative value(s) for degrading any of the one or more substrate peptides being 0.5 or higher; or equivalent degrading activities on the reference peptide and the substrate peptide(s) thereto, wherein the reference peptide is GGGGG or GGGG, the one or more substrate peptides are selected from the group consisting of GGGXG, GXGGG, GGXG, and GXGG, and X is any amino acid residue other than glycine.

BRIEF DESCRIPTION OF THE DRAWINGS

FIG. 1 shows the bactericidal power of enzymes against *Staphylococcus aureus*. The error bar represents a standard deviation (n=3).

FIG. 2 shows the detergency of enzymes against collar and cuff stains. The error bar represents a standard deviation (n=3).

FIG. 3 shows the detergency against collar and cuff stains enhanced by using BLP and an alkaline protease in combination. The error bar represents a standard deviation (n=4).

FIG. 4 shows SDS-PAGE gel images for keratin solutions treated with various enzymes.

FIG. 5 shows SDS-PAGE gel images and a western blotting detection image for a solution of keratin extracted from the heel corneum.

FIG. 6 shows an SDS-PAGE gel image for insoluble corneum fractions treated with enzymes.

FIG. 7 shows the amino acid sequence of keratin 10. The bold letter portions represent the peptide sequences identified by mass spectrometry in Example 6.

FIG. 8 shows ΔA595 values for supernatants of reaction solutions containing enzymes and wool-derived keratin azure.

FIG. 9 shows an SDS-PAGE gel image for BLP-treated recombinant loricrin fused with a tag sequence.

FIG. 10 shows the amino acid sequence of loricrin.

DETAILED DESCRIPTION OF THE INVENTION

Development of a detergent with a higher detergency against corneum-derived stains is desired. The present invention relates to a detergent with a high detergency against corneum-derived stains and a method for washing corneum-derived stains including using the detergent. The present inventors found that M23A subfamily proteases had a high ability to degrade corneum-derived stains. The M23A subfamily protease enzymes provided by the present invention have an excellent ability to degrade corneum-derived stains (e.g., collar and cuff stains). A detergent with a high detergency against corneum-derived stains can be obtained by adding the enzymes to a detergent.

Additionally, the present invention relates to a method for evaluating the ability of an enzyme or a composition containing the enzyme to degrade corneum-derived stains. Given that keratin and loricrin, the principal components of the stratum corneum, have glycine-rich regions (Non-Patent Literature 4), it was inferred that a protease which could cleave a Gly-Gly bond should be capable of washing corneum-derived stains. Accordingly, the present inventors investigated the ability of protease belonging to the M23 family to degrade corneum-derived stains as proteases which can cleave the Gly-Gly bond (Example 2 described below). Unexpectedly, the results showed that, although proteases could cleave the Gly-Gly bond, some did not have the ability to degrade corneum-derived stains, whereas others had the ability to degrade corneum-derived stains. Accordingly, the present inventors examined the substrate specificity of these enzymes and found that the proteases not having the ability to degrade corneum-derived stains and those having this ability had distinct activities on specific peptides. Based on these results, the present inventors found that the ability of an enzyme or a composition containing the enzyme to degrade corneum-derived stains could be evaluated using the degrading activity of the enzyme on specific peptides as reference. According to the present invention, the ability of an enzyme or a composition containing the enzyme to degrade corneum-derived stains can be evaluated with a simple method. Therefore, the present invention is useful to develop an enzyme and an enzyme composition with a high ability to degrade corneum-derived stains or a detergent with a high detergency against corneum-derived stains.

In the present specification, amino acid residues are also expressed by abbreviations as follows: alanine, Ala or A; arginine, Arg or R; asparagine, Asn or N; aspartic acid, Asp or D; cysteine, Cys or C; glutamine, Gln or Q; glutamic acid, Glu or E; glycine, Gly or G; histidine, His or H; isoleucine, Ile or I; leucine, Leu or L; lysine, Lys or K; methionine, Met or M; phenylalanine, Phe or F; proline, Pro or P; serine, Ser or S; threonine, Thr or T; tryptophan (Trp or W), tyrosine, Tyr or Y; valine, Val or V; and arbitrary amino acid residue, Xaa or X. In the present specification, the amino acid sequence of a peptide is shown with the amino terminus (hereinafter referred to as N-terminus) on the left-hand side and the carboxyl terminus (hereinafter referred to as C-terminus) on the right-hand side according to a usual method.

In the present specification, the expression "at least 80% identity" with regard to a nucleotide sequence or an amino acid sequence refers to identity of 80% or higher, preferably 85% or higher, more preferably 90% or higher, further preferably 95% or higher, further preferably 97% or higher, further preferably 98% or higher, further preferably 99% or higher.

In the present specification, the identity between nucleotide sequences or between amino acid sequences can be calculated by the Lipman-Pearson method (Science, 1985, 227:1435-41). Specifically, the identity can be calculated by performing an analysis using a homology analysis program (Search Homology) of a genetic information processing software Genetyx-Win (Ver. 5.1.1; Software Development Co., Ltd.) and setting the Unit size to compare (ktup) at 2.

In the present specification, a "corresponding position" in an amino acid sequence or a nucleotide sequence can be determined by aligning a target sequence and a reference sequence (e.g., the amino acid sequence set forth in SEQ ID NO: 2) so that the conserved amino acid residues or nucleotides present in each amino acid sequence or nucleotide sequence should have the maximum homology (alignment). Alignment can be performed using a known algorithm, and the procedure is known to those skilled in the art. For example, alignment can be performed using the ClustalW multiple alignment program (Thompson, J. D. et al, 1994, Nucleic Acids Res., 22:4673-4680) with default setting. Alternatively, ClustalW2 and Clustal omega, which are revised versions of ClustalW, can also be used. ClustalW, ClustalW2, and Clustal omega can be used on the website of, for example, European Bioinformatics Institute (EBI <www.ebi.ac.uk/index.html>) or DNA data bank of Japan (DDBJ <www.ddbj.nig.ac.jp/Welcome-j.html>) operated by National Institute of Genetics.

The position of an amino acid residue or a nucleotide in the target sequence aligned at a position corresponding to an arbitrary position in the reference sequence by the above-described alignment is regarded as the "position corresponding" to the arbitrary position. If an amino acid residue at the "corresponding position" in the target sequence is the same as that in the reference sequence, the amino acid residue is regarded as the "amino acid residue corresponding to" the amino acid residue in the reference sequence. For example, if the amino acid residue in the target sequence, which is at the position corresponding to H22 in the amino acid sequence of SEQ ID NO:2, is H, this is the amino acid residue corresponding to H22 in the amino acid sequence of SEQ ID NO: 2.

In the present specification, the expression "operably linking" a target gene to a regulatory region means positioning the regulatory region and the target gene on DNA so that the function of the regulatory region to regulate gene expression should act on the target gene. Examples of a method for operably linking the target gene to the regulatory region include a method of ligating the target gene downstream of the regulatory region.

In the present specification, the term "corneum-derived stains" refers to stains on clothes or a fabric product caused by attaching corneocytes or components thereof in the skin surface layer to the clothes or the fabric product. In the present specification, the term "collar and cuff stains" refers to one type of "corneum-derived stains," and these stains are black-brown color stains on a collar or cuffs of clothes caused by contact and rubbing between the collar or cuffs and the skin. These stains are also called "black stains" or "collar and cuff stains." The "corneum-derived stains" in the present specification are commonly observed on the collar or cuffs of clothes, and therefore are "collar and cuff stains" in many cases. However, the "corneum-derived stains" in the present specification should not be construed in a restrictive manner and are not limited to stains on collar and cuffs of clothes.

The main causative substance of corneum-derived stains is skin corneum (i.e., protein). Therefore, detergents containing a protease have been conventionally used to wash corneum-derived stains. It is known that the principal components of the stratum corneum are keratin and loricrin. Furthermore, it has been indicated that the components of collar and cuff stains include loricrin and keratin 10 proteins (Non-Patent Literatures 1 and 2). Therefore, the "corneum-derived stains" in the present specification can be replaced with "stains containing loricrin and keratin 10 derived from the skin or the stratum corneum" in other words. The "collar and cuff stains" in the present specification can be replaced with "stains on collar or cuffs of clothes containing loricrin and keratin 10 derived from the skin or the stratum corneum."

In the present specification, a glycine-rich region refers to a region consisting of arbitrary 20 consecutive amino acids in a protein of a molecular weight of 25,000 or higher, which region contains a sequence having two or more consecutive glycine residues (-Gly-Gly-) and 10 or more glycine residues.

In the present specification, the term "animal fiber" refers to fiber, thread, fabric, texture, garment, or the like obtained from animals. Examples of the animal fiber include wool, silk, cashmere, and feather, and preferably wool.

An M23A subfamily protease and M23B subfamily protease refer to protease each belonging to the M23A subfamily and the M23B subfamily, respectively, in the M23 family among protease families listed in the MEROPS database <http://merops.sanger.ac.uk>. In the MEROPS database, enzymes are classified into families or subfamilies based on the methods described in the following papers (Nucleic Acids Res., 1999, 27:325-331; J. Struct. Biol., 2001, 134: 95-102; and Nucleic Acids Res., 2016, 44:D343-D350). The M23 family protease degrades peptidoglycan in the bacterial cell wall and includes metalloendopeptidase which exhibits a lytic activity. Further, the M23 family proteases include protease which can cleave a Gly-Gly bond (The Journal of Biochemistry, 124(2), 332-339, 1998; Japanese Journal of Bacteriology, 52(2), 461-473, 1997; The Journal of Biological Chemistry, 268(10), 7503-7508, 1993; The Journal of Biological Chemistry, 268(12), 9071-9078, 1993; and The Journal of Biological Chemistry, 281(1), 549-558, 2006).

In the MEROPS database release 11.0, the M23A subfamily includes three proteases as holotypes: β-lytic metalloprotease (beta-lytic metallopeptidase; BLP) (MEROPS ID: M23.001), Las A protein (LasA or LAS) (MEROPS ID: M23.002), which is also called staphylolysin, and *Aeromonas hydrophila* proteinase (AhP) (MEROPS ID: M23.003), which is also called Mername-AA291 peptidase. BLP, LasA, and AhP are polypeptides represented by the amino acid sequences set forth in SEQ ID NOS: 2, 4, and 6, respectively. In contrast, the M23B subfamily includes a plurality of proteases such as ALE-1 glycylglycine endopeptidase (ALE-1) (MEROPS ID: M23.012) and lysostaphin (MEROPS ID: M23.004). ALE-1 is a polypeptide consisting of the amino acid sequence set forth in SEQ ID NO: 8.

Preferably, the term "M23A subfamily protease" in the present specification refers to at least one selected from the group consisting of β-lytic metalloprotease (BLP), LasA protein (LasA or LAS), and *Aeromonas hydrophila* proteinase (AhP). In the present invention, any one of BLP, LasA, and AhP may be used, and any two or three may be used in combination. Preferably, the M23A subfamily protease used in the present invention include BLP, and the M23A subfamily protease is more preferably BLP.

Beta-lytic metalloprotease (BLP), Las A protein (LasA or LAS), and *Aeromonas hydrophila* proteinase (AhP) are an enzyme having an activity of cleaving a glycine-glycine bond in a peptide sequence. Preferred examples of BLP include a polypeptide consisting of the amino acid sequence set forth in SEQ ID NO: 2. Another example of BLP is a polypeptide consisting of an amino acid sequence having at least 80% identity to the amino acid sequence set forth in SEQ ID NO: 2, preferably consisting of an amino acid sequence having amino acid residues corresponding to H22, D36, H121, and H123 in the amino acid sequence set forth in SEQ ID NO: 2, and having an activity of cleaving a glycine-glycine bond in a peptide sequence. Preferred examples of LasA include a polypeptide consisting of the amino acid sequence set forth in SEQ ID NO: 4. Another example of LasA is a polypeptide consisting of an amino acid sequence having at least 80% identity to the amino acid sequence set forth in SEQ ID NO: 4, preferably consisting of an amino acid sequence having amino acid residues corresponding to H23, D36, H120, and H122 in the amino acid sequence set forth in SEQ ID NO: 4, and having an activity of cleaving a glycine-glycine bond in a peptide sequence. Preferred examples of AhP include a polypeptide consisting of the amino acid sequence set forth in SEQ ID NO: 6. Another example of AhP is a polypeptide consisting of an amino acid sequence having at least 80% identity to the amino acid sequence set forth in SEQ ID NO: 6, preferably consisting of an amino acid sequence having amino acid residues corresponding to H21, D34, H118, and H120 in the amino acid sequence set forth in SEQ ID NO: 6, and having an activity of cleaving a glycine-glycine bond in a peptide sequence.

The above-mentioned M23A subfamily protease can be extracted or prepared from a microorganism which produces them or a culture broth thereof. For example, BLP can be extracted or prepared from *Lysobacter* sp. (NBRC 12725 or NBRC 12726), *Achromobacter lyticus* M497-1, *Lysobacter* sp. IB-9374, *Lysobacter gummosus* DSMZ 6980, or the like or a culture broth thereof, LasA can be extracted or prepared from *Pseudomonas aeruginosa* PA01, *Pseudomonas aeruginosa* ATCC 10145, *Pseudomonas aeruginosa* FRD1, or the like or a culture broth thereof, and AhP can be extracted or prepared from *Aeromonas hydrophila* subsp. *hydrophila* ATCC 7966, *Aeromonas hydrophila* (Chester) Stanier (ATCC 51307), or the like or a culture broth thereof. The above-mentioned microorganisms can be purchased from public culture collections. Microorganisms producing the M23A subfamily protease can be cultured under appropriate conditions using a medium containing a carbon source, nitrogen source, metal salt, vitamin, and the like which can be assimilated. The enzyme can be collected and prepared from the microorganisms thus obtained or a culture broth thereof by a common method, and a required enzyme form can be further obtained by lyophilization, spray drying, crystallization, and the like. For example, the enzyme can be collected and prepared from the culture broth using usual methods such as isolation of a microorganism by centrifugation or filtration, precipitation of the enzyme in a supernatant or a filtrate by adding a salt such as ammonium sulfate or precipitation by adding an organic solvent such as ethanol, concentration or desalting using an ultrafiltration membrane or the like, and purification using various chromatography procedures such as ion exchange or gel filtration.

Alternatively, the M23A subfamily protease can be manufactured by a chemical synthesis or a biological technique using the above-mentioned amino acid sequences. For example, an M23A subfamily protease can be obtained by culturing a microorganism transformed to express an M23A subfamily protease gene chemically synthesized on the basis of the amino acid sequence and then preparing the target enzyme from the microorganism or a culture broth thereof. Examples of such a transformed microorganism include a microorganism obtained by introducing an M23A subfamily protease gene operably linked to the regulatory region into the genome of a host cell or a plasmid, a microorganism obtained by introducing an expression vector incorporated with the target gene at an appropriate position, and the like. Examples of the M23A subfamily protease gene include a gene coding for the above-described BLP consisting of the sequence of SEQ ID NO: 1 or a sequence having at least 80% identity thereto, a gene coding for the above-described LasA consisting of the sequence of SEQ ID NO: 3 or a sequence having at least 80% identity thereto, and a gene coding for the above-described AhP consisting of the sequence of SEQ ID NO: 5 or a sequence having at least 80% identity thereto.

In the present specification, the "regulatory region" of a gene is a region which has a function of regulating expression of the gene downstream of the region in a cell, preferably has a function of expressing the downstream gene constitutively or highly. Specifically, the regulatory region can be defined as a region which is present upstream of the coding region in the gene and has a function of regulating transcription of the gene by interacting with RNA polymerase. Preferably, the regulatory region of a gene in the present specification refers to a region of approximately 200 to 600 nucleotides upstream of the coding region in the gene. The regulatory region includes a transcription initiation regulatory region and/or a translation initiation regulatory region of the gene, or a region ranging from the transcription initiation regulatory region to the translation initiation regulatory region. The transcription initiation regulatory region is a region including a promoter and transcription initiation point, and the translation initiation regulatory region is a site corresponding to the Shine-Dalgarno (SD) sequence, which forms a ribosomal binding site together with the start codon (Shine J., Dalgarno L., Proc. Natl. Acad. Sci. USA., 1974, 71:1342-1346).

The expression vector containing an M23A subfamily protease gene can be prepared by incorporating the M23A subfamily protease gene into a vector which can carry the gene stably, maintain replication in the host microorganism, and express the M23A subfamily protease stably. Examples of such a vector include pUC18, pBR322, and pHY300PLK when *Escherichia coli* is used as a host and pUB110, pHSP64 (Sumitomo et al., Biosci. Biotechnol. Biocem., 1995, 59:2172-2175), and pHY300PLK (Takara Bio Inc.) when *Bacillus subtilis* is used as a host.

The host microorganism can be transformed by a protoplast method, a competent cell method, an electroporation method, or the like. Examples of the host microorganism include, but are not particularly limited to, Gram-positive bacteria belonging to the genus *Bacillus* (e.g., *Bacillus subtilis*), Gram-negative bacteria such as *Escherichia coli*, bacteria belonging to the genus *Streptomyces*, and fungi belonging to the genera *Saccharomyces* (yeast) and *Aspergillus* (fungi). Preferred host is a microorganism of the same species or belonging to the same genus as that from which the M23A subfamily protease gene to be introduced into the host is derived, *Escherichia coli*, and bacteria belonging to the genus *Bacillus*, and more preferred host is bacteria belonging to the genus *Bacillus*.

The obtained transformant can be cultured under appropriate conditions using a medium containing a carbon source, nitrogen source, metal salt, vitamin, and the like which can be assimilated. An enzyme can be collected and prepared from the microorganism thus obtained or a culture broth thereof by a common method, and a required enzyme form can be further obtained by lyophilization, spray drying, crystallization, or the like. For example, an enzyme can be collected and prepared from the culture using a usual method such as isolation of a recombinant microorganism by centrifugation or filtration, precipitation of the enzyme in a supernatant or a filtrate by adding a salt such as ammonium sulfate or precipitation by adding an organic solvent such as ethanol, concentration or desalting using an ultrafiltration membrane or the like, and purification using various chromatography procedures such as ion exchange and gel filtration.

Alternatively, the M23A subfamily protease can be prepared from an enzyme composition containing the enzyme or the like. For example, BLP can be prepared from Achromopeptidase. Achromopeptidase is a bacteriolytic enzyme derived from *Lysobacter* enzymogenes and contains BLP. Achromopeptidase is commercially available from Wako Pure Chemical Industries, Ltd. or the like.

The present invention will be explained in more detail below by showing specific embodiments.

(A. Method for Evaluating Ability to Degrade Corneum-Derived Stains)

Keratin and loricrin, the principal components of the stratum corneum, have a glycine-rich region (Non-Patent Literature 4 and FIGS. 7 and 10). The present inventors inferred that a protease which could cleave a Gly-Gly bond in the glycine-rich region should be capable of washing corneum-derived stains. Accordingly, the present inventors investigated the detergency against corneum-derived stains of BLP, LasA, AhP, ALE-1, and lysostaphin, which are known as an M23 family protease that can cleave a Gly-Gly bond (Example 2). Unexpectedly, the results showed that, although the protease is an M23 family protease which could cleave a Gly-Gly bond, ALE-1 and lysostaphin, a protease belonging to the M23B subfamily, did not demonstrate detergency against corneum-derived stains, whereas BLP, LasA and AhP, a protease belonging to the M23A subfamily, demonstrated detergency against corneum-derived stains. The present inventors further investigated the keratin-degrading activity of BLP, LasA and AhP (Examples 4 and 5) and the loricrin-degrading activity of BLP (Example 8).

These results suggested that BLP, LasA, and AhP exhibited detergency against corneum-derived stains by degrading proteins of the corneum.

Subsequently, aiming at understanding the mechanism associated with the difference between the M23A subfamily protease and the M23B subfamily protease in ability (detergency) to degrade corneum-derived stains, the present inventors investigated the activity of these proteases to degrade various peptides having a glycine-glycine bond. The results showed that the M23A subfamily protease, which has a high ability to degrade corneum-derived stains, showed the degrading activity on all the investigated peptides having a glycine-glycine bond (Example 9). In contrast, the protease belonging to the M23B subfamily, which did not show the ability to degrade corneum-derived stains, showed a weak activity on peptides having a pentaglycine (GGGGG) sequence but did not show a significant activity on a peptide which has a glycine-glycine bond as well as an amino acid other than glycine. These results suggested that, to degrade corneum-derived stains, an enzyme needs to have an ability to degrade a peptide containing a high proportion of glycine as well as an amino acid other than glycine, in addition to the ability to cleave a Gly-Gly bond. It was therefore considered that the level of degrading activity on various peptides having a glycine-glycine bond could serve as an indicator of the ability of an enzyme to degrade corneum-derived stains (detergency).

Therefore, in one aspect, the present invention provides a method for evaluating the ability of an enzyme or a composition containing the enzyme to degrade corneum-derived stains. The method of the present invention includes measuring the degrading activity of a test enzyme or a composition containing the test enzyme on a peptide having GGGGG or GGGG (hereinafter also referred to simply as "reference peptide" in the present specification) and a peptide having a glycine-glycine bond as well as an amino acid other than glycine between glycine residues (hereinafter also referred to simply as "substrate peptide" in the present specification).

The reference peptide used in the method of the present invention is preferably one or more selected from the group consisting of GGGGG (SEQ ID NO: 30) and GGGG (SEQ ID NO: 31), more preferably GGGGG or GGGG, further preferably GGGGG. The substrate peptide used in the method of the present invention is preferably one or more selected from the group consisting of GGGXG, GXGGG, GGXG, and GXGG, more preferably GGGXG (X represents any amino acid residue other than glycine). Preferably, X in the substrate peptide is selected from S, Y, L, and F. More preferably, the substrate peptide is one or more selected from the group consisting of GGGSG, GGGYG, GGGLG, and GGGFG (SEQ ID NOS: 32 to 35). Further preferably, the substrate peptide contains at least GGGSG and GGGYG. In one embodiment, the substrate peptides are GGGSG and GGGYG. In another embodiment, the substrate peptide is GGGSG, GGGYG, and GGGFG. Further preferably, the substrate peptide is GGGSG, GGGYG, GGGLG, and GGGFG. In the method of the present invention, the degrading activity of a test enzyme or a composition containing the test enzyme on these reference peptides and substrate peptides is measured.

The types of the test enzyme evaluated according to the method of the present invention and the species of an original organism thereof are not particularly limited. The test enzyme may be a naturally occurring enzyme or an artificial variant thereof. Preferably, the test enzyme is a protease.

Additionally, examples of a composition containing a test enzyme evaluated according to the method of the present invention include a composition containing a combination of two or more enzymes including the test enzyme, or one or more enzymes including the test enzyme and other components other than the enzymes. Preferably, the test enzyme is a protease.

The composition may contain an enzyme other than the test enzyme. Examples of the other enzymes include one or more hydrolases selected from the group consisting of a protease which is not the test enzyme, cellulase, β-glucanase, hemicellulase, lipase, peroxidase, laccase, amylase (e.g., α-amylase, glucoamylase), cutinase, pectinase, reductase, oxidase, phenoloxidase, liguninase, pullulanase, pectate lyase, xyloglucanase, xylanase, pectin acetylesterase, polygalacturonase, rhamnogalacturonase, pectin lyase, mannanase, pectin methylesterase, cellobiohydrolase, and transglutaminase. Of these, one or a combination of two or more of proteases which are not the test enzyme, cellulase, amylase, and lipase are preferred. Examples of the protease which is not the test enzyme include, but are not limited to, an alkaline protease which is not the test enzyme.

Examples of other components which are not enzymes and can be contained in the composition include components usually used for a detergent composition. Examples of those other components can include water, surfactants, chelating agents, water-soluble polymers, water-miscible organic solvents, alkali agents, organic acids or salts thereof, enzyme stabilizers, fluorescent agents, anti-redeposition agents, dispersing agents, color-migration preventing agent, soft finishing agents, bleaching agents such as hydrogen peroxide, antioxidants, solubilizers, pH adjusting agents, buffers, preservatives, fragrances, salts, alcohols, and saccharides. As the surfactants, one or a combination of two or more arbitrary surfactants such as anionic surfactants, nonionic surfactants, amphoteric surfactants, and cationic surfactants can be used.

Therefore, further examples of the composition containing a test enzyme used in the method of the present invention include a detergent composition containing the test enzyme. The detergent composition may be a solid composition such as a powder or liquid composition, preferably a liquid detergent composition. The detergent composition is preferably a laundry detergent composition, more preferably a liquid laundry detergent composition. Of note, in the present specification, a test enzyme or a composition containing the test enzyme used according to the method of the present invention may be referred to collectively as "test substance."

The degrading activity of the test enzyme or the composition containing the test enzyme on the reference peptide or the substrate peptide can be determined by bringing the test enzyme or the composition containing the test enzyme into contact with the reference peptide or the substrate peptide and then measuring the quantity of the reference peptide or the substrate peptide degraded. Examples of a technique for measuring the quantity of peptides degraded include FRET (fluorescence energy transfer) assay, gas chromatography, liquid chromatography, and thin layer chromatography. Of these, FRET assay is preferred.

When degradation of the reference peptide or the substrate peptide is quantified by FRET assay, preferably, a FRET substrate containing the reference peptide or the substrate peptide positioned between a fluorescence group and a quenching group is prepared. When the FRET substrate is brought into contact with an enzyme and the reference peptide or the substrate peptide contained therein is degraded, the distance between the fluorescence group and the quenching group changes, resulting in a change in the intensity of fluorescence emitted from the fluorescence group. Degradation of the reference peptide or the substrate peptide can be quantified by measuring the change in the intensity of fluorescence from the fluorescence group. Examples of a combination of the fluorescence group and the quenching group in the FRET substrate include a combination of a fluorescence group of Nma, 2-(N-methylamino)benzoyl, and a quenching group of Lys(Dnp), a lysine residue (Lys) having 2,4-dinitrophenyl (Dnp) in the side chain. FRET substrates having these fluorescence group, quenching group, and predetermined peptides as well as reagents and solvents for FRET reactions using the substrates are commercially available and can be purchased from, for example, PH Japan Co., Ltd. and the like.

In a reaction solution used to measure the quantity of the reference peptide or the substrate peptide degraded, the concentration of the test enzyme in terms of protein mass is preferably from 0.01 to 50 µg/mL, and the concentration of the reference peptide or the substrate peptide is preferably from 1 to 3,000 µM, but the concentration is not limited to these concentrations. Reaction temperature and pH may be optimal conditions for the test enzyme or conditions which may be assumed when the test enzyme is used for degradation of corneum-derived stains. It is preferable to initiate measurement immediately after the test enzyme is brought into contact with the reference peptide or the substrate peptide and to maintain a sufficiently high concentration of the reference peptide or the substrate peptide in the reaction solution, in order that change in the fluorescence intensity due to enzymatic degradation of the reference peptide or the substrate peptide can be detected with time and the enzymatic reaction is not completed during the measurement time. The reaction time is not particularly limited but is preferably approximately from 0.1 to 10 minutes for FRET assay and about from several minutes to several hours for chromatography.

The degrading activity of the test substance on the reference peptide or the substrate peptide is determined on the basis of fluorescence intensity measured by FRET assay. Preferably, the degrading activity can be obtained using a calibration curve. The calibration curve can be drawn by, for example, measuring the fluorescence intensity of a standard solution under the same reaction conditions as in the assay of the test substance. Examples of the standard solution include a solution which does not contain the test enzyme and contains FRETS-25-STD1 (Peptide Institute, Inc., 3720-v) dissolved with dimethyl sulfoxide instead of FRET-GGGXG, unlike a reaction solution used for the assay of the test substance. The degrading activity of the test substance can be shown as a specific activity (activity per mg of protein mass of the test substance; unit, U/mg). The protein mass of the test substance can be obtained using commercially available kits such as the DC Protein Assay Kit (Bio-Rad) and a known method (e.g., Lowry method, Bradford method).

Preferably, the degrading activities of the test substance on the reference peptide and the substrate peptides are measured by the following method: an FRET substrate containing GGGXG (X is any of G, S, Y, L, and F) between Nma and Lys (Dnp) (hereinafter referred to as FRET-GGGXG) is used as a substrate. In the FRET substrate, Nma binds to the N-terminus side of GGGXG, and Lys (Dnp) binds to the C-terminus side of GGGXG. 190 µL of an enzyme solution containing a test enzyme or a composition containing the test enzyme (test enzyme, 20 mM Tris-HCl [pH 7.5]) is added to a 96-well assay plate, and 10 µL of an FRET-GGGXG solution (1 mM FRET-GGGXG, 100 mM Tris-HCl [pH 7.5]) is further added to prepare a reaction solution. The fluorescence intensity of the reaction solution is measured with time using a fluorescence plate reader at a temperature of 30° C., an excitation wavelength of 340 nm, and a measurement wavelength of 440 nm. Meanwhile, under the same conditions as the above-mentioned reaction conditions, the fluorescence intensity of a reaction solution prepared using a 20 mM Tris-HCl solution (pH 7.5) instead of the enzyme solution and FRETS-25-STD1 (Peptide Institute, Inc., 3720-v) dissolved with dimethyl sulfoxide instead of FRET-GGGXG is measured to draw a calibration curve. The activity per unit (U) is defined as the quantity of an enzyme required to show a change in the fluorescence intensity equivalent to the fluorescence intensity caused by 1 nmol of FRETS-25-STD1 per minute. A specific activity of the test substance to degrade the reference peptide or the substrate peptide (activity per mg of protein mass of the test substance; U/mg) is calculated. The protein mass of the test substance can be obtained using the DC Protein Assay Kit (Bio-Rad). Of note, the above-mentioned procedure is one example, and the measurement conditions can be determined as appropriate depending on the type of the test substance used and the like in measurement of the degrading activity of the test substance according to by the present invention.

Preferably, in the method of the present invention, the ability of the test enzyme or the composition containing the test enzyme to degrade corneum-derived stains is evaluated on the basis of the level of the degrading activity of the test enzyme or the composition containing the test enzyme on each of the reference peptide and the substrate peptides. The level of the degrading activity on the reference peptide is evaluated on the basis of, preferably, the specific activity of the test substance. Meanwhile, the level of the degrading activity of each substrate peptide is evaluated on the basis of, preferably, the relative value of the degrading activity on each substrate peptide based on the degrading activity on the reference peptide (i.e., relative degrading activity). Preferably, in the method of the present invention, the specific activity of the test enzyme or the composition containing the test enzyme for degrading each of the above-described reference peptide and substrate peptides is obtained. Subsequently, the relative value of the specific activity on each of the obtained substrate peptides based for the specific activity on the reference peptide is obtained. The specific activities based on the reference peptide and the substrate peptides can be obtained by following the above-described procedure.

Therefore, preferably, in the method of the present invention, a test enzyme or a composition containing the test enzyme is selected as that having the ability to degrade corneum-derived stains when the specific activity of the test substance or the composition containing the test enzyme for degrading the reference peptide is a predetermined value or higher, and the above-described relative degrading activity thereof on any substrate peptide is a predetermined value or higher. For example, in the method of the present invention, a test enzyme or a composition containing the test enzyme is selected when the specific activity of the test enzyme or the composition containing the test enzyme for degrading the reference peptide is 10 U/mg or higher, and the relative degrading activities thereof on any one or more substrate peptides obtained as described above are 0.5 or higher (for example, a case where the specific activities of the test enzyme or the composition containing the test enzyme on any one or more substrate peptides are 0.5 or higher when the specific activity of the test enzyme or the composition containing the test enzyme on the reference peptide is 1). More preferably, a test enzyme or a composition containing the test enzyme is selected when the specific activity of the test enzyme or the composition containing the test enzyme for degrading the reference peptide is 10 U/mg or higher, and the relative degrading activities on any two or more substrate peptides are 0.5 or higher. Further preferably, a test enzyme or a composition containing the test enzyme is selected when the specific activity of the test enzyme or the composition containing the test enzyme for degrading the reference peptide is 10 U/mg or higher, and the relative degrading activities on all the substrate peptides used are 0.5 or higher. The selected test enzyme or composition containing the test enzyme is determined to have the ability to degrade corneum-derived stains. However, a test enzyme or a composition containing the test enzyme having the specific activity for degrading the reference peptide being lower than 10 U/mg or a test enzyme or a composition containing the test enzyme having the relative activity for degrading any substrate peptide being lower than 0.5 is not considered to have the ability to degrade corneum-derived stains.

Alternatively, in the present invention, the degrading activities of the test enzyme or the composition containing the test enzyme on the reference peptide and the substrate peptide may be evaluated according to criteria other than the above described specific activity per mg of protein mass of the test enzyme. For example, the quantity of the reference peptide and the substrate peptide degraded by the test enzyme or the composition containing the test enzyme is measured using luminescence, fluorescence, colorimetric reaction, absorbance, or other usual methods used to quantify an enzymatic degradation product. The degrading activity can be further evaluated by obtaining the relative value of the degrading activity on each substrate peptide based on the degrading activity on the reference peptide from the measured values of quantity of the reference peptide and the substrate peptide degraded and determining whether the obtained measurement value corresponds to the above-described specific activity of 10 U/mg or higher on the basis of the calibration curve prepared beforehand and the pre-specified reference value.

The test enzyme or the composition containing the test enzyme selected by the above procedures and determined to have the ability to degrade the corneum-derived stains can be further selected as a corneum-derived stains-degrading enzyme, an enzyme composition for degrading corneum-derived stains, or a candidate substance thereof. Accordingly, one embodiment of the method of the present invention is a method for selecting a corneum-derived stains-degrading enzyme, a composition for degrading corneum-derived stains, or a candidate substance thereof.

The test enzyme or the composition containing the test enzyme selected according to the method of the present invention by the above-described procedures is subjected to further evaluation, if necessary, and can be selected as a target corneum-derived stains-degrading enzyme or a composition for degrading corneum-derived stains. Examples of the further evaluation include, but are not limited to, evaluation of the ability to degrade actual collar and cuff stains and evaluation of the ability to degrade a corneum sample or keratin or loricrin extracted therefrom.

Given that an enzyme or a composition containing the enzyme determined according to the method of the present invention to have the ability to degrade corneum-derived stains has a high specific activity on a substrate containing glycine abundantly, it is inferred that the enzyme has high selectivity to a glycine-rich region. In fact, no glycine-rich region was identified in a product of degradation reaction of keratin having a glycine-rich region by an M23A subfamily protease having the degrading activity on the above-mentioned substrate peptide, and a region other than glycine-rich region was maintained (Examples 6 and 9). However, it is inferred that, because wool keratin has no glycine-rich region, it is hardly degraded by the enzyme or a composition containing the enzyme selected according to the method of the present invention (UniProt Knowledgebase_P02534, UniProt Knowledgebase_P25691). Therefore, the enzyme or the composition containing the enzyme selected according to the method of the present invention is very likely to have the ability to degrade corneum-derived stains while having a low ability to degrade animal fibers such as wool keratin. In other words, the enzymes determined to have the ability to degrade corneum-derived stains are expected to have a low ability to degrade animal fibers (or low damaging property against animal fibers) such as wool according to the method of the present invention.

Therefore, another embodiment of the method of the present invention can be a method for evaluating the ability of an enzyme or a composition containing the enzyme to degrade animal fibers (or the damaging property against animal fibers) in addition to the ability to degrade corneum-derived stains. In the method, if necessary, a test enzyme or a composition containing the test enzyme is further subjected to evaluation of the ability to degrade animal fibers or evaluation of the ability to degrade corneum-derived stains and animal fibers and can be selected as a candidate of an enzyme or a composition having the ability to degrade corneum-derived stains and a low ability to degrade animal fibers (or a low damaging property against animal fibers). Preferably, in the method, a test enzyme or a composition containing the test enzyme selected as an enzyme or a composition having the ability to degrade corneum-derived stains by the above-mentioned procedures is further subjected to evaluation of the ability to degrade animal fibers or evaluation of the ability to degrade corneum-derived stains and animal fibers.

Examples of means for evaluating the ability of a test enzyme or a composition containing the test enzyme to degrade animal fibers include measurement of the degrading activity of the test enzyme or the composition containing the test enzyme on animal fibers or keratin and analysis of products of degradation of animal fibers or keratin by the test enzyme or the composition containing the test enzyme. As the animal fibers or keratin, animal fiber-derived keratin is preferred, wool keratin is more preferred, and wool-derived keratin azure is further preferred. Additionally, animal fibers or keratin bound with a dye, a fluorescence substance, or the like is also preferred as a substrate used for to evaluating the degrading ability because the degrading ability can be evaluated easily by measuring the absorbance or fluorescence intensity of the supernatant of a centrifuged reaction solution.

Examples of means for evaluating the ability of a test enzyme or a composition containing the test enzyme to degrade corneum-derived stains and animal fibers include measurement of the degrading activity of the test enzyme or the composition containing the test enzyme on keratins and analysis of products of degradation of keratins by the test enzyme or the composition containing the test enzyme. As the keratin, a keratin with a molecular weight of 35,000 or higher having a glycine-rich region is preferred, keratin 1 or 10 is more preferred, and keratin 10 is further preferred. For example, keratin 10 can be obtained by scraping the corneum off a human heel, adding thereto a solubilizing solution (100 mM Tris-HCl [pH 8.5], 2% SDS, 25 mM DTT, 5 mM EDTA), heating at 100° C. for 10 minutes, centrifuging, and dialyzing a supernatant against a dialysis buffer (20 mM Tris-HCl [pH 7.5], 0.1% SDS) overnight.

The keratin-degrading activity of a test enzyme or a composition containing the test enzyme can be measured by bringing the test enzyme or the composition containing the test enzyme into contact with the keratin and then measuring the molecular weight of a keratin fragment, which is a degradation product generated by the enzymatic reaction. When the enzyme and the keratin are brought into contact with each other, the concentration of the enzyme in terms of protein mass is preferably from 0.001 to 100,000 μg/mL, more preferably from 0.01 to 10,000 μg/mL, further preferably from 0.1 to 1,000 μg/mL. The concentration of the keratin in terms of protein mass is preferably from 0.001 to 10,000 g/L, more preferably from 0.1 to 100 g/L, further preferably from 0.1 to 10 g/L but is not limited to these concentrations. The reaction temperature and pH may be optimal conditions for the test enzyme, or conditions which may be assumed when the test enzyme is used to degrade corneum-derived stains. The reaction time is not particularly limited but is preferably from 1 to 3,000 minutes, more preferably from 60 to 1,500 minutes, further preferably from 60 to 600 minutes.

Examples of a technique to measure the molecular weight of the keratin fragment include electrophoresis methods (e.g., SDS-PAGE), gel filtration chromatography, and dynamic light scattering methods. Of these, SDS-PAGE is preferred. Therefore, the molecular weight of keratin or a fragment thereof in the present specification is preferably a molecular weight measured by SDS-PAGE. An example of the procedure to measure a molecular weight by SDS-PAGE is as follows: An electrophoresis sample is prepared by mixing a sample solution containing a keratin fragment with an equal volume of 2× Laemmli Sample Buffer containing 50 mM dithiothreitol and heating the mixture at 100° C. for 5 minutes. This electrophoresis sample is subjected to electrophoresis using Any kD™ Mini-Protean (registered trade name) TGX™ Precast Gel and an electrophoresis buffer (25 mM tris, 192 mM glycine, 0.1 w/v % SDS [pH 8.3]). At this time, Precision Plus Protein™ Dual Color Standards is used as a molecular weight marker. After electrophoresis, the gel is subjected to CBB staining or ruby staining. A value obtained by inserting the mobility of the target protein or polypeptide into the formula of the calibration curve drawn using the molecular weight and the mobility of the molecular weight marker is determined as the molecular weight of the target protein or polypeptide. Here, the mobility (Rf value) of the sample is a relative value of the distance from the upper end of the gel (or a position at which the sample was applied) to the band of the sample when the distance from the upper end of the gel (or a position at which the sample is applied) to the preceding dye (bromophenol blue is 1, in a lane to which the sample was poured. Of note, the above-mentioned procedure of measuring the molecular weight by SDS-PAGE is one example of a procedure of measuring the molecular weight of a keratin fragment according to the present invention, the measurement conditions can be determined and the markers and the like can be selected as appropriate depending on the molecular weight of the keratin fragment and degradation products used.

In the method of the present invention, in case of the molecular weight of the keratin fragment obtained as above being 50% or higher and 97% or lower to the molecular weight of keratin before being brought into contact with the test enzyme or the composition containing the test enzyme (e.g., full-length keratin), the test enzyme or the composition containing the test enzyme is determined to have the ability to degrade corneum-derived stains and further have a low ability to degrade animal fibers. Such a test enzyme or composition is selected as a corneum-derived stains-degrading enzyme or a composition for degrading corneum-derived stains with a low damaging property against animal fibers.

However, when the molecular weight of the keratin fragment obtained as above is more than 97% the molecular weight of a full-length keratin (i.e., degradation of the keratin is not detected), the test enzyme or the composition containing the test enzyme is determined to have a low ability to degrade corneum-derived stains. Or, when the molecular weight of the keratin fragment obtained as above is lower than 50% of the molecular weight of full-length keratin, the test enzyme or the composition containing the test enzyme is determined to have a high ability to degrade animal fibers. Such a test enzyme or composition has a high damaging property against animal fibers.

(B. Detergent for Corneum-Derived Stains)

In the above-described method for evaluating the ability to degrade corneum-derived stains according to the present invention, it was found that, among M23 family proteases, M23A subfamily proteases such as BLP, LasA, and AhP had detergency against corneum-derived stains. Therefore, in further one aspect, the present invention provides a detergent for corneum-derived stains. The detergent for corneum-derived stains of the present invention contains an M23A subfamily protease as an active ingredient. In another aspect, the present invention provides use of an M23A subfamily protease in manufacture of a detergent for corneum-derived stains. In yet another aspect, the present invention provides use of an M23A subfamily protease for washing corneum-derived stains. In the present invention, the corneum-derived stains are preferably collar and cuff stains. In one embodiment, the washing is soak washing, and the detergent of the present invention is a detergent for soak washing. However, the type of the washing according to the present invention and the forms of the detergent of the present invention are not limited to these types and forms.

In the present invention, an M23A subfamily protease is used as an active ingredient for washing corneum-derived stains. An M23A subfamily protease used in the present invention can be an enzyme determined to have the ability to degrade corneum-derived stains by the above-described method for evaluating the ability to degrade corneum-derived stains according to the present invention. More specifically, M23A subfamily proteases used in the present invention can be characterized by the specific activity for degrading the reference peptide being 10 U/mg or higher and relative values for the degrading activities on one or more substrate peptides based on the degrading activity on the reference peptide being 0.5 or higher. The reference peptide is GGGGG (SEQ ID NO: 30) or GGGG (SEQ ID NO: 31), preferably GGGGG. The substrate peptide is one or more selected from the group consisting of GGGXG, GXGGG, GGXG, and GXGG, preferably GGGXG (X represents any amino acid residue other than glycine), more preferably one or more selected from the group consisting of GGGSG, GGGYG, GGGLG, and GGGFG (SEQ ID NOS: 32 to 35). Preferably, the M23A subfamily protease has a specific activity for degrading GGGGG being 10 U/mg or higher and a relative specific activity for degrading GGGSG, GGGYG, GGGLG, or GGGFG being 0.5 or higher when the specific activity for degrading GGGGG is 1. The specific activities of the M23A subfamily protease for degrading the reference peptide and the substrate peptides can be calculated from the activity of the enzyme and the quantity of the protein measured according to the methods described in Reference Examples 2 and 3, which are described later.

In a preferred embodiment, the M23A subfamily protease used in the present invention is at least one selected from the group consisting of BLP, LasA, and AhP. In a more preferred embodiment, the M23A subfamily protease used in the present invention is BLP.

In the present invention, an enzyme composition containing the M23A subfamily protease can be used as an active ingredient for washing corneum-derived stains. Preferably, the enzyme composition contains at least one selected from the group consisting of BLP, LasA, and AhP. More preferably, the enzyme composition contains BLP. Preferred examples of the enzyme composition include Achromopeptidase.

In one embodiment, the detergent for corneum-derived stains of the present invention can be essentially composed of the above-mentioned M23A subfamily protease or an enzyme composition containing the M23A subfamily protease. In a preferred embodiment, the detergents for corneum-derived stain of the present invention is a composition containing the above-mentioned M23A subfamily protease or an enzyme composition containing the M23A subfamily protease. In other words, the M23A subfamily protease or the enzyme composition containing the M23A subfamily protease used as an active ingredient in the present invention can be used in the form of a composition containing the M23A subfamily protease or the enzyme composition containing the M23A subfamily protease.

As shown in Example 1, which is described later, M23A subfamily proteases have a bactericidal property against Gram-positive bacteria such as *Staphylococcus aureus*. Therefore, in the present invention, the M23A subfamily protease or a composition containing the M23A subfamily protease can be used as a component for not only washing corneum-derived stains, but also killing Gram-positive bacteria. Therefore, in one embodiment, the detergent for corneum-derived stains of the present invention has a bactericidal property against Gram-positive bacteria.

As described above, "corneum-derived stains" include loricrin and keratin, and the M23A subfamily protease determined to have the ability to degrade corneum-derived stains in the evaluating method of the present invention has a keratin-degrading activity (Examples 4 and 5) and a loricrin-degrading activity (Example 8). Therefore, in one embodiment, the detergent for corneum-derived stains of the present invention is a detergent for stains including keratin or loricrin. Preferably, the keratin is keratin 1 or keratin 10, more preferably keratin 10.

As described above, the M23A subfamily protease determined to have the ability to degrade corneum-derived stains in the evaluating method of the present invention has a low ability to degrade animal fibers such as wool keratin (or a low damaging property against animal fibers) compared with proteinase K (Example 7). Preferably, the M23A subfamily proteases degrade keratin with a molecular weight of 35,000 or higher and a glycine-rich region, preferably keratin 10, so that the molecular weight is maintained at 50% or higher and 97% or lower. Therefore, the detergent for corneum-derived stains of the present invention is a detergent for corneum-derived stains with a low damaging property against animal fibers. More specifically, the detergent for corneum-derived stains of the present invention has a lower ability to degrade animal fibers, preferably wool keratin, compared with a detergent having the same composition except that proteinase K is contained instead of an M23A subfamily protease as an active ingredient thereof.

Examples of the composition containing the M23A subfamily protease or an enzyme composition containing the M23A subfamily protease include a detergent composition, preferably a laundry detergent composition. The detergent composition may be a solid composition such as a powder or liquid composition, but a liquid detergent composition is preferred. More preferably, the detergent composition is a liquid laundry detergent composition.

The content of the M23A subfamily protease contained in the detergent composition of the present invention is not particularly limited as long as it is the quantity for the protease to exhibit its activity, but is preferably from 0.001 to 80,000 mg per kg of the detergent composition, more preferably from 0.01 to 10,000 mg, further preferably from 0.1 to 3,000 mg.

The detergent composition of the present invention contains a surfactant and water in addition to an M23A subfamily protease. As a surfactant, one or a combination of two or more arbitrary surfactants such as an anionic surfactant, nonionic surfactants, amphoteric surfactants, and cationic surfactants can be used. The content of the surfactant in the detergent composition of the present invention is preferably from 10 to 80 mass %, more preferably from 30 to 70 mass %.

The nonionic surfactant may be a nonionic surfactant which has a C8-C22 hydrocarbon group commonly contained in a liquid detergent and to which several or more moles of C2 oxyalkylene groups are added, and examples thereof include the following:

$R_1O$-$(AO)_m$—H ($R_1$=C8-C22 hydrocarbon group, AO=C2-05 oxyalkylene group, m=16-35) [JP-A-2010-275468];

$R_1O$-$(EO)_l$-$(AO)_m$-$(EO)_n$—H ($R_1$=C8-C18 hydrocarbon group, EO=C2 oxyalkylene group, AO=C3-C5 oxyalkylene group, l=3-30, m=1-5,1+n=14-50) [JP-A-2010-265445, JP-A-2011-63784];

$R_1O$-$(EO)_m/(AO)_n$—H ($R_1$=C8-C22 hydrocarbon group, EO=C2 oxyalkylene group, AO=C3-C5 oxyalkylene group, m=10-30, n=0-5, EO and AO are bound by a random or block bond) [JP-A-2010-189551];

$R_1(CO)_lO$-$(EO)_m/(AO)_n$—$R_2$ ($R_1$=C8-C22 hydrocarbon group, EO=C2 oxyalkylene group, AO=C3-C5 oxyalkylene group, l=0-1, m=14-50, n=1-5, $R_2$=hydrogen (1=0) or C1-C3 alkyl group, EO and AO are bound by a random or block bond) [JP-A-2010-229385];

$R_1O$-$(EO)_m$-$(AO)_n$—H ($R_1$=C8-C22 hydrocarbon group, EO=C2 oxyalkylene group, AO=C3-C5 oxyalkylene group, m=15-30, n=1-5) [JP-A-2010-229387];

$R_1O$-$(AO)_m/(Gly)_n$-H and/or $R_2$—COO-$(AO)_p/(Gly)_q$-H ($R_1$=C8-C22 hydrocarbon group, $R_2$=C7-C21 hydrocarbon group, AO=C2-C3 oxyalkylene group, Gly=glycerol group, m=0-5, n=2-10, p=0-5, q=2-10, AO and Gly are bound by a random or block bond) [JP-A-2010-254881];

$R_1$—COO—$(PO)_m/(EO)_n$—$R_2$ ($R_1$=C7-C21 hydrocarbon group, COO=carbonyloxy group, $R_2$=C1-C3 alkyl group, PO=oxypropylene group, EO=oxyethylene group, m=0.3-5, n=8-25, PO and EO are bound by a random or block bond) [JP-A-2010-265333];

$R_1O$-$(EO)_l$—$(PO)_m$-$(EO)_n$—H ($R_1$=C8-C20 hydrocarbon group, EO=C2 oxyalkylene group, PO=oxypropylene group, l≥1, n≥1, 0<m<l+n, EO and PO are bound by a block bond) [WO98/24865];

R$_1$O-(EO)$_m$—(PO)$_n$—H (R$_1$=C10-C16 alkyl group or alkenyl group, EO=ethylene oxide group, PO=propylene oxide group, m=5-15, n=1-3) [JP-A-8-157867];

R$_1$(CO)-(EO)$_m$—OR$_2$ (R$_1$=C11-C13 straight or branched alkyl group or alkenyl group, R$_2$=C1-C3 alkyl group, EO=ethylene oxide group, m=10-20) [JP-A-2008-7706, JP-A-2009-7451, JP-A-2009-155594, JP-A-2009-155606];

R$_1$(CO)-(AO)—OR$_2$ (R$_1$=C9-C13 straight or branched alkyl group or alkenyl group, AO=C2-C4 oxyalkylene group, R$_2$=C1-C3 alkyl group, m=5-30) [JP-A-2009-144002, JP-A-2009-173858, JP-A-2010-189612];

R$^{1c}$—O-(A'O)$_m$—H (R$^{1c}$ is an aliphatic hydrocarbon group having a carbon number of 8 or more and 18 or less, A'O is an alkyleneoxy group selected from an alkyleneoxy groups having 2 carbon atoms and an alkyleneoxy group having 3 carbon atoms, m is an average number of moles of A'O added, which is 3 or more and 50 or less) [JP-A-2017-071664]; and fatty acid alkanolamide, fatty acid alkanol glucamide, alkyl polyglycoside, and the like.

Examples of the anion surfactant include a carboxylate anion surfactant, a sulfonic acid or sulfate anion surfactant, a non-soap anion surfactant, straight alkylbenzenesulfonic acid, benzenesulfonic acid or a salt thereof, polyoxybenzenesulfonic acid or a salt thereof, polyoxyethylenealkyl sulfate salt, polyoxyalkylenealkyl ether sulfate salt, α-olefin sulfonate, internal olefin sulfonate, alkylbenzenesulfonate, α-sulfofatty acid salt, fatty acid soap, phosphate salt surfactant, acylalaninate, acyltaurate, alkyl ether carboxylic acid, and alcohol sulfate.

Examples of the cation surfactant include a quaternary ammonium salt having a long-chain alkyl group, tertiary amine having one long-chain alkyl group, alkyltrimethylammonium salt, dialkyldimethylammonium salt, and alkylpyridinium salt. Preferred examples include a quaternary ammonium surfactant having one long-chain alkyl group having 8 to 22 carbon atoms and tertiary amine having one long-chain alkyl group having 8 to 22 carbon atoms.

Examples of the ampholytic ionic surfactants include an alkyl betaine type, alkyl amidobetaine type, imidazoline type, alkyl aminosulfone type, alkyl aminocarboxylic acid type, alkyl amide carboxylic acid type, amide amino acid type, or phosphoric acid type amphoteric surfactant, such as betaine alkylacetate, alkanolamide betaine propyl acetate, alkyl imidazoline, and alkyl alanine. Preferred examples include sulfobetaine or carbobetaine having an alkyl group having 10 to 18 carbon atoms.

The detergent composition of the present invention can further contain components usually used for a detergent composition such as, for example, a chelating agent, water-soluble polymer, water-miscible organic solvent, alkali agent, organic acid or a salt thereof, enzyme other than the M23A subfamily protease, enzyme stabilizer, fluorescent agent, anti-redeposition agent, dispersing agent, color-migration preventing agent, soft finishing agent, bleaching agent such as hydrogen peroxide, antioxidant, solubilizer, pH adjusting agent, buffer, preservative, fragrance, salt, alcohol, and saccharide.

Examples of the chelating agent include an aminopolyacetic acid such as nitrilotriacetic acid, iminodiacetic acid, ethylenediamineacetic acid, diethylenetriaminepentaacetic acid, glycol ether diaminetetraacetic acid, hydroxyethyl iminodiacetic acid, triethylenetetraaminehexaacetic acid, djenkolic acid or a salt thereof; an organic acid such as diglycolic acid, oxydisuccinic acid, carboxymethyloxysuccinic acid, citric acid, lactic acid, tartaric acid, oxalic acid, malic acid, gluconic acid, carboxymethylsuccinic acid, carboxymethyl tartaric acid and a salt thereof, and aminotri(methylene phosphonic acid), 1-hydroxyethylidene-1,1-diphosphonic acid, ethylenediamine tetra(methylene phosphonic acid), diethylene triamine penta(methylene phosphonic acid), and alkali metal or a lower amine salt thereof. Examples of the chelating agent in the detergent composition of the present invention are as mentioned above. The content of the chelating agent in the detergent composition of the present invention is preferably from 0.1 to 5 mass %, more preferably from 0.1 to 4 mass %.

Examples of the water-soluble polymer include a polymer compound having (i) a polyether chain portion which contains an epoxide-derived polymerization unit having 2 to 5 carbon atoms and (ii) a polymer chain portion which contains a polymerization unit derived from one or more unsaturated carboxylic acid monomers, which is selected from acrylic acid, methacrylic acid, and maleic acid, and a graft structure in which either (i) or (ii) is the main chain, and the other is a branched chain (JP-A-2010-275468, JP-A-10-060496); and a water-soluble polymer having an alkylene terephthalate unit and/or an alkylene isophthalate unit and an oxyalkylene unit and/or a polyoxyalkylene unit (JP-A-2009-155606). The content of the water-soluble polymer in the detergent composition of the present invention is preferably from 0.2 to 10 mass %, more preferably from 0.4 to 5 mass %.

Examples of the water-miscible organic solvents include alkanols such as alkylene glycols and glycerin, polyalkylene glycols, (poly)alkylene glycol (mono or di)alkyl ethers, alkyl glyceryl ethers, and aromatic ethers of (poly)alkylene glycol. Alkylene glycols having 2 to 6 carbon atoms, such as ethylene glycol, propylene glycol, butylene glycol, or hexylene glycol, glycerin, polyethylene glycol monophenyl ether, ethylene glycol monobenzyl ether, and diethylene glycol monobenzyl ether, are preferred. The content of the water-miscible organic solvent in the detergent composition of the present invention is preferably from 1 to 40 mass %, more preferably from 1 to 35 mass %.

Examples of the alkali agents include alkanolamine having one to three C2-C4 alkanols, such as monoethanolamine, diethanolamine, triethanolamine, polyoxyalkylene amine, and dimethylaminopropylamine. Monoethanolamine and triethanolamine are preferred. The content of the alkali agent in the detergent composition of the present invention is preferably from 0 to 20 mass %, more preferably from 0 to 10 mass %.

Examples of the organic acid or a salt thereof include polyvalent carboxylic acid such as saturated fatty acid, succinic acid, maleic acid, and fumaric acid, or a salt thereof; and hydroxycarboxylic acid such as citric acid, malic acid, glycolic acid, p-hydroxy benzoic acid, and benzoic acid or a salt thereof. Of these, citric acid or a salt thereof is particularly preferred. The content of the organic acid or a salt thereof in the detergent composition of the present invention is preferably from 0 to 5 mass %, more preferably from 0 to 3 mass %.

Examples of the anti-redeposition agents and the dispersing agents include polyacrylic acid, polymaleic acid, carboxymethylcellulose, polyethylene glycol having a weight-average molecular weight of 5,000 or more, maleic anhydride-diisobutylene copolymer, maleic anhydride-methyl vinyl ether copolymer, maleic anhydride-vinyl acetate copolymer, naphthalene sulfonate formalin condensate, and the polymers described in claims 1 to 21 of JP-A-59-62614 (from page 1. column 3, line 5 to page 3, column 4, line 14). However, if they are not suitable for mixture, they may be excluded.

Examples of the color-migration preventing agents include polyvinylpyrrolidone, and the content is preferably from 0.01 to 10 mass %.

Examples of the bleaching agents include bleaching agents such as hydrogen peroxide, percarbonate, and perfluoborate, and 1 to 10 mass % of the bleaching agent is preferably contained in the detergent composition. When a bleaching agent is used, 0.01 to 10 mass % of tetraacetylethylenediamine (TAED), the bleaching activator described in JP-A-6-316700, and the like can be contained in the detergent composition.

Examples of the fluorescent agents include biphenyl type fluorescent agents (e.g., Tinopal CBS-X) and stilbene type fluorescent agents (e.g., DM type fluorescent dye). The content of the fluorescent agent in the detergent composition of the present invention is preferably from 0.001 to 2 mass %.

Examples of an enzyme other than the M23A subfamily protease include other protease and hydrolases such as cellulase, β-glucanase, hemicellulase, lipase, peroxidase, laccase, amylase, cutinase, pectinase, reductase, oxidase, phenoloxidase, liguninase, pullulanase, pectate lyase, xyloglucanase, xylanase, pectin acetylesterase, polygalacturonase, rhamnogalacturonase, pectin lyase, mannanase, pectin methylesterase, cellobiohydrolase, and transglutaminase, and a combination of two or more of them. Of these, other proteases, cellulase, amylase, and lipase, or a combination of two or more thereof is preferred.

Examples of amylase include α-amylase and glucoamylase. Examples of other proteases include proteases conventionally used for detergents (For example, those described in JP-A-2012-45000). As the other proteases, proteases with optimal pH close to the pH during washing are preferred. For example, when the composition of the present invention is an alkaline detergent, the other protease is preferably a protease with optimal pH on the alkali side rather than neutral pH (i.e., alkaline protease). Preferred examples of the alkaline protease are subtilisin protease derived from *Bacillus* sp., particularly, subtilisin protease derived from *Bacillus halodurans*, and *Bacillus clausii*, commercially available alkaline proteases, and the like. Examples of the commercially available alkaline protease include Alcalase (registered trade name), Savinase (registered trade name), Everlase (registered trade name), esperase, Kannase (registered trade name), and Ovozyme (registered trade name), which can be purchased from Novozymes Japan, and Purafect (registered trade name) and Properase, which can be purchased from Genencor International. Additionally, the protease described in JP-A-2013-233141 (KSM-KP43; SEQ ID NO: 26) or the protease described in JP-B-4348047 (K-16; SEQ ID NO: 27) can be used preferably.

Preferred examples of the alkaline proteases include KSM-KP43 (SEQ ID NO: 26) and K-16 (SEQ ID NO: 27). Further, preferred examples of the alkaline protease used in the present invention also include alkaline proteases which are variants of KSM-KP43, alkaline proteases consisting of an amino acid sequence having at least 80% identity to the amino acid sequence set forth in SEQ ID NO: 26, alkaline proteases which are variants of K-16, and alkaline proteases consisting of an amino acid sequence having at least 80% identity to the amino acid sequence set forth in SEQ ID NO: 27. In the composition of the present invention, one or a combination of two or more of these alkaline proteases can be used.

In the composition of the present invention, the mass ratio of the M23A subfamily protease to the alkaline protease is preferably 1/20 or higher, more preferably from 1/3 to 20, further preferably from 1 to 5, further more preferably from 2 to 3.

Examples of the enzyme stabilizer include a boron compound, calcium ion source (calcium ion supplying compound), hydroxy compound, and formic acid. Examples of the antioxidant include butylated hydroxytoluene, distyrenated cresol, sodium sulfite, and sodium hydrogen sulfite. Examples of the solubilizer include paratoluenesulfonic acid, cumenesulfonic acid, meta-xylenesulfonic acid, and benzoate (also effective as a preservative). Further, the detergent composition of the present invention may contain water-immiscible organic solvent including paraffins such as octane, decane, dodecane, and tridecane, olefins such as decene and dodecene, halogenated alkyl compounds such as methylene chloride and 1,1,1-trichloroethane, terpenes such as D-limonene, dyes, fragrances, antibacterial preservatives, defoaming agents such as silicones, and the like.

Alternatively, the detergent composition of the present invention can be manufactured by adding an M23A subfamily protease to an existing detergent composition. Preferred examples of the detergent composition to which an M23A subfamily protease can be added include the liquid detergent compositions described in the examples of JP-A-2010-265333, JP-A-2014-141662, JP-A-2009-191128, JP-A-2012-224652, JP-A-2013-503950, and JP-A-11-512768. For example, the detergent composition of present invention can be prepared by adding an M23A subfamily protease to the liquid detergent composition described in Example 4 of JP-A-2014-141662 (a composition containing 30% surfactant [20% anion surfactant and 10% nonionic surfactant], 3% citric acid, 18% organic solvent having a hydroxyl group [diethylene glycol monobutyl ether], alkali agent [monoethanolamine] required to prepare the composition having a pH 8.0, ion exchange water, a fragrance, and the like).

Use of the detergent composition of present invention is not limited, but the detergent composition of present invention is used to wash preferably clothes or fabric products (e.g., sheet, blanket, pillowcase, sofa cover, towel). More preferably, the detergent composition of the present invention is a laundry detergent composition for clothes. Preferably, the detergent composition of the present invention is used to wash clothes having a collar or cuffs or contacting the neck around (e.g., shirt, dress shirt, sweater, jacket, coat, scarf, muffler). Preferably, the detergent composition of the present invention is a laundry detergent composition for washing corneum-derived stains, preferably a laundry detergent composition for washing collar and cuff stains.

In further one aspect, the present invention provides a method for washing corneum-derived stains including using an M23A subfamily protease. In this method, as an M23A subfamily protease, an enzyme composition containing the M23A subfamily protease may be used. In one embodiment, the method of the present invention can be a method for washing corneum-derived stains including using the above-described detergent for corneum-derived stains of the present invention. Preferably, the method for washing corneum-derived stains according to the present invention include bringing an object to be washed in need of removal of corneum-derived stains into contact with an M23A subfamily protease (or the detergent for corneum-derived stains of the present invention). Preferably, the corneum-derived stains are collar and cuff stains in the method of the present invention.

In the method of the present invention, in order to bring an object to be washed in need of removal of corneum-derived stains (e.g., clothes or a fabric product having corneum-derived stains) into contact with an M23A subfamily protease or the detergent for corneum-derived stains of the present invention, the object to be washed may be soaked in water in which the M23A subfamily protease, the detergent for corneum-derived stains of the present invention or the detergent composition containing the M23A subfamily protease and the detergent for corneum-derived stain are dissolved, or the M23A subfamily protease, the detergent for corneum-derived stains of the present invention or the detergent composition containing the M23A subfamily protease and the detergent for corneum-derived stain may be directly applied to a corneum-derived stain site of the object to be washed. In the method of the present invention, the object to be washed which is soaked in or applied with the detergent composition may be further washed by hand, in a washing machine but such washing is not necessarily required.

The present invention also encompasses the substances, manufacturing methods, usages, methods, and the like described below as exemplary embodiments. However, the present invention is not limited to these embodiments.

[1] A detergent for corneum-derived stains comprising an M23A subfamily protease as an active ingredient.

[2] Preferably, the detergent according to [1], wherein the corneum-derived stains are collar and cuff stains.

[3] Preferably, the detergent according to [1] or [2], wherein the detergent comprises, as an active ingredient, an enzyme composition comprising the M23A subfamily protease.

[4] The detergent according to any one of [1] to [3], wherein the M23A subfamily protease is
preferably, one having the specific activity for degrading a reference peptide being 10 U/mg or higher, and the relative value of the degrading activity on each of one or more substrate peptides being 0.5 or higher based on the degrading activity on the reference peptide, when the reference peptide is GGGGG or GGGG, the substrate peptide is one or more selected from the group consisting of GGGXG, GXGGG, GGXG, and GXGG, and X is any amino acid residue other than glycine,
more preferably, one having the specific activity for degrading GGGGG being 10 U/mg or higher, and the relative specific activity for degrading GGGSG, GGGYG, GGGLG, or GGGFG being 0.5 or higher when the specific activity for degrading GGGGG is 1,
further preferably at least one selected from the group consisting of β-lytic metalloprotease, LasA protein, and *Aeromonas hydrophila* proteinase.

[5] Preferably, the detergent according to [4], wherein the β-lytic metalloprotease is at least one selected from the group consisting of a polypeptide consisting of the amino acid sequence set forth in SEQ ID NO: 2 and a polypeptide consisting of an amino acid sequence having at least 80% identity to the amino acid sequence set forth in SEQ ID NO: 2 and having an activity for cleaving a glycine-glycine bond in a peptide sequence.

[6] Preferably, the detergent according to [4] or [5], wherein the LasA protein is at least one selected from the group consisting of a polypeptide consisting of the amino acid sequence set forth in SEQ ID NO: 4 and a polypeptide consisting of an amino acid sequence having at least 80% identity to the amino acid sequence set forth in SEQ ID NO: 4 and having an activity for cleaving a glycine-glycine bond in a peptide sequence.

[7] Preferably, the detergent according to any one of [4] to [6], wherein the *Aeromonas hydrophila* proteinase is at least one selected from the group consisting of a polypeptide consisting of the amino acid sequence set forth in SEQ ID NO: 6 and a polypeptide consisting of an amino acid sequence having at least 80% identity to the amino acid sequence set forth in SEQ ID NO: 6 and having an activity for cleaving a glycine-glycine bond in a peptide sequence.

[8] Preferably, the detergent according to [3], wherein the enzyme composition is Achromopeptidase.

[9] Preferably, the detergent according to any one of [3] to [8], wherein the enzyme composition further comprises at least one selected from the group consisting of a protease other than the M23A subfamily protease, cellulase, amylase, and lipase.

[10] Preferably, the detergent according to [9], wherein the protease other than the M23A subfamily protease is an alkaline protease.

[11] The detergent according to [10], wherein the alkaline protease is
preferably an alkaline protease derived from bacteria belonging to the genus *Bacillus*,
more preferably, at least one selected from the group consisting of an alkaline protease consisting of the amino acid sequence set forth in SEQ ID NO: 26 or an amino acid sequence having at least 80% identity thereto and an alkaline protease consisting of the amino acid sequence set forth in SEQ ID NO: 27 or an amino acid sequence having at least 80% identity thereto.

[12] The detergent according to [10] or [11], wherein the mass ratio of the M23A subfamily protease to the alkaline protease is preferably 1/20 or higher, more preferably from 1/3 to 20, further preferably from 1 to 5, even further preferably from 2 to 3.

[13] Preferably, the detergent according to any one of [1] to [12], which is a detergent for soak washing.

[14] Preferably, the detergent according to any one of [1] to [13], which has a bactericidal property against Gram-positive bacteria.

[15] A method for washing corneum-derived stains, comprising using the detergent according to any one of [1] to [14].

[16] Preferably, the washing method according to [15], which is a method for washing collar and cuff stains.

[17] Preferably, the washing method according to [15] or [16], comprising soaking an object to be washed in the detergent.

[18] Preferably, the method according to any one of [15] to [17], which is a method for washing corneum-derived stains and killing Gram-positive bacteria.

[19] Use of an M23A subfamily protease or a composition containing the M23A subfamily protease for production of a detergent for corneum-derived stains.

[20] Use of an M23A subfamily protease or a composition containing the M23A subfamily protease for washing of corneum-derived stains.

[21] Preferably, the use according to [19] or [20], wherein the corneum-derived stains are collar and cuff stains.

[22] The use according to any one of [19] to [21], wherein the M23A subfamily protease is
preferably, one having the specific activity for degrading a reference peptide being 10 U/mg or higher, and the relative value of the degrading activity on each of one or more substrate peptides being 0.5 or higher based on the degrading activity on the reference peptide, when the reference peptide is GGGGG or GGGG, the substrate peptide is one or more selected from the group consisting of GGGXG, GXGGG, GGXG, and GXGG, and X is any amino acid residue other than glycine, more preferably, one having the specific activity for degrading GGGGG being 10 U/mg or higher, and the relative specific activity for degrading GGGSG, GGGYG, GGGLG, or GGGFG being 0.5 or higher when the specific activity for degrading GGGGG is 1, further preferably, at least one selected from the group consisting of β-lytic metalloprotease, LasA protein, and *Aeromonas hydrophila* proteinase.

[23] Preferably, the use according to [22], wherein the β-lytic metalloprotease is at least one selected from the group consisting of a polypeptide consisting of the amino acid sequence set forth in SEQ ID NO: 2 and a polypeptide consisting of an amino acid sequence having at least 80% identity to the amino acid sequence set forth in SEQ ID NO: 2 and having an activity for cleaving a glycine-glycine bond in a peptide sequence.

[24] Preferably, the use according to [23], wherein the polypeptide consisting of an amino acid sequence having at least 80% identity to the amino acid sequence set forth in SEQ ID NO: 2 and having an activity for cleaving a glycine-glycine bond in a peptide sequence has amino acid residues corresponding to H22, D36, H121, and H123 in the amino acid sequence set forth in SEQ ID NO: 2.

[25] Preferably, the use according to any one of [22] to [24], wherein the LasA protein is at least one selected from the group consisting of a polypeptide consisting of the amino acid sequence set forth in SEQ ID NO: 4 and a polypeptide consisting of an amino acid sequence having at least 80% identity to the amino acid sequence set forth in SEQ ID NO: 4 and having an activity for cleaving a glycine-glycine bond in a peptide sequence.

[26] Preferably, the use according to [25], wherein the polypeptide consisting of an amino acid sequence having at least 80% identity to the amino acid sequence set forth in SEQ ID NO: 4 and having an activity for cleaving a glycine-glycine bond in a peptide sequence has amino acid residues corresponding to H23, D36, H120, and H122 in the amino acid sequence set forth in SEQ ID NO: 4.

[27] Preferably, the use according to any one of [22] to [26], wherein the *Aeromonas hydrophila* proteinase is at least one selected from the group consisting of a polypeptide consisting of the amino acid sequence set forth in SEQ ID NO: 6 and a polypeptide consisting of an amino acid sequence having at least 80% identity to the amino acid sequence set forth in SEQ ID NO: 6 and having an activity for cleaving a glycine-glycine bond in a peptide sequence.

[28] Preferably, the use according to [27], wherein the polypeptide comprising an amino acid sequence having at least 80% identity to the amino acid sequence set forth in SEQ ID NO: 6 and having an activity for cleaving a glycine-glycine bond in a peptide sequence has amino acid residues corresponding to H21, D34, H118, and H120 in the amino acid sequence set forth in SEQ ID NO: 6.

[29] Preferably, the use according to any one of [19] to [21], wherein the composition is Achromopeptidase.

[30] Preferably, the use according to any one of [19] to [29], wherein the composition further comprises at least one selected from the group consisting of a protease other than the M23A subfamily protease, cellulase, amylase, and lipase.

[31] Preferably, the use according to [30], wherein the protease other than the M23A subfamily protease is an alkaline protease.

[32] The use according to [31], wherein the alkaline protease is preferably, an alkaline protease derived from bacteria belonging to the genus *Bacillus*, more preferably, at least one selected from the group consisting of an alkaline protease consisting of the amino acid sequence set forth in SEQ ID NO: 26 or an amino acid sequence having at least 80% identity thereto and an alkaline protease consisting of the amino acid sequence set forth in SEQ ID NO: 27 or an amino acid sequence having at least 80% identity thereto.

[33] The use according to [31] or [32], wherein the mass ratio of the M23A subfamily protease to the alkaline protease in the composition is preferably ½₀ or higher, more preferably from ⅓ to 20, further preferably from 1 to 5, even further preferably from 2 to 3.

[34] Preferably, the use according to any one of [19] and [21] to [33], wherein the detergent for corneum-derived stains is a detergent for soak washing.

[35] Preferably, the use according to any one of [19] and [21] to [34], wherein the detergent for corneum-derived stains has a bactericidal property against Gram-positive bacteria.

[36] Preferably, the use according to any one of [20] to [33], which is use for washing corneum-derived stains by soak washing.

[37] Preferably, the use according to any one of [20] to [33] and [36], which is use for washing corneum-derived stains and killing Gram-positive bacteria.

[38] A method for evaluating the ability of an enzyme or a composition comprising the enzyme to degrade corneum-derived stains, comprising:

measuring degrading activity of a test enzyme or a composition comprising the test enzyme on a reference peptide and one or more substrate peptides;

obtaining relative value of the degrading activity on each of the one or more substrate peptides based on the degrading activity on the reference peptide; and selecting the test enzyme or the composition comprising the test enzyme having:

specific activity for degrading the reference peptide being 10 U/mg or higher and the relative value(s) for any of the one or more of the substrate peptides being 0.5 or higher; or equivalent degrading activities on the reference peptide and substrate peptide(s) thereto, wherein the reference peptide is GGGGG or GGGG, the one or more substrate peptides are selected from the group consisting of GGGXG, GXGGG, GGXG, and GXGG, and X is any amino acid residue other than glycine.

[39] Preferably, the method according to [38], wherein the reference peptide is GGGGG.

[40] Preferably, the method according to [38] or [39], wherein X in the substrate peptide is selected from S, Y, L, and F.

[41] The method according to any one of [38] to [40], wherein the substrate peptide is preferably, GGGXG,
more preferably, one or more selected from the group consisting of GGGSG, GGGYG, GGGLG, and GGGFG,
further preferably, GGGSG, GGGYG, GGGLG, and GGGFG.
[42] Preferably, the method according to any one of [38] to [41], wherein the test enzyme is a protease.
[43] Preferably, the method according to any one of [38] to [42], wherein the measurement of the degrading activity comprises bringing the test enzyme or the composition comprising the test enzyme into contact with the reference peptide or the substrate peptide and then measuring the quantity of the reference peptide or the substrate peptide degraded.
[44] Preferably, the method according to [43], wherein the measurement of the quantity of the reference peptide or the substrate peptide degraded is performed by FRET assay, gas chromatography, liquid chromatography, or thin layer chromatography.
[45] Preferably, the method according to any one of [38] to [44], wherein the measurement of the degrading activity further comprises obtaining a specific activity.
[46] Preferably, the method according to any one of [38] to [45], comprising selecting the selected test enzyme or composition comprising the test enzyme as a candidate substance for the corneum-derived stains-degrading enzyme or the composition for degrading corneum-derived stains.
[47] Preferably, the method according to any one of [38] to [46], which is a method for evaluating the ability to degrade corneum-derived stains and the damaging property against animal fibers of an enzyme or a composition comprising the enzyme.
[48] Preferably, the method according to [47], comprising selecting the selected test enzyme or composition comprising the test enzyme as an enzyme or a composition having the ability to degrade corneum-derived stains and a low damaging property against animal fibers.
[49] Preferably, the method according to [48], further comprising evaluating the ability of the test enzyme or the composition comprising the test enzyme to degrade animal fibers.
[50] Preferably, the method according to [49], further comprising bringing the selected test enzyme or composition comprising the test enzyme into contact with keratin and measuring the molecular weight of a generated keratin fragment.
[51] Preferably, the method according to [50], further comprising selecting the test enzyme or the composition comprising the test enzyme as an enzyme or a composition comprising the enzyme having the ability to degrade corneum-derived stains and a low damaging property against animal fibers in case of the molecular weight of the measured keratin fragment being 50% or higher and 97% or lower to the molecular weight of keratin before brought into contact with the test enzyme or the composition comprising the test enzyme.
[52] Preferably, the method according to [50] or [51], wherein the keratin is a keratin having a molecular weight of 35,000 or higher.
[53] Preferably, the method according to [50] or [51], wherein the keratin is keratin 10.
[54] Preferably, the method according to [50] or [51], wherein the keratin is keratin azure.
[55] Preferably, the method according to any one of [47] to [54], wherein the animal fiber is wool.
[56] Preferably, the method according to any one of [38] to [55], wherein the corneum-derived stains are collar and cuff stains.
[57] Preferably, the method according to any one of [38] to [56], wherein the composition comprising a test enzyme is a detergent composition.

EXAMPLES

The present invention will be explained below more specifically using Examples. However, the technical scope of the present invention is not limited to these Examples.

A list of primers used in this Example is shown in Table 1.

TABLE 1

| Primer name | Sequence | SEQ ID NO: |
|---|---|---|
| BLP_S237signal_F | GAAGGAAACACTCGTATGAAAAAAATCTCAAAAGC | 9 |
| BLP_S237signal_R | AACTAGTTTAATAGATTAGTTCGGTCCAGGATTCAC | 10 |
| vector-F | TCTATTAAACTAGTTATAGGGTTATCTAAAGG | 11 |
| vector-sig-R | ACGAGTGTTTCCTTCTGCTGC | 12 |
| ΔS237N_fw | TGCAGCAATGAAAAAAATCTCAAAAGCTGGTCTGG | 13 |
| ΔS237N_rv | TTTTTCATTGCTGCAAGAGCTGCCGGAA | 14 |
| LasA_F | GCAGCTCTTGCAGCACATGATGATGGCCTG | 15 |
| LasA_CR | TAGTTTAATAGATTAGTGGTGGTGGTGGTGCAGAGCCAGTCCCGG | 16 |
| pHY_just_F | TAATCTATTAAACTAGTTATAGGGTTATCTAAAGG | 17 |
| pHY_just_R_NEW | TGCTGCAAGAGCTGCCGGAAA | 18 |
| LasA_Chis_n_F | TAATCTATTAAACTAGTTATAGGGTTATCTAAAGG | 19 |
| LasA_Chis_n_R | CAGAGCCAGTCCCGGATTATAC | 20 |

TABLE 1-continued

| Primer name | Sequence | SEQ ID NO: |
|---|---|---|
| 2F | TTAGGAGGTAATATGATGTCTCGTCCGATCC | 21 |
| 2R_bacillus-Chis | AACTAGTTTAATAGATTAGTGGTGGTGGTGGTGGTC GATTCCGTT | 22 |
| vector-R | CATATTACCTCCTAAATATTTTAAAGTAATTG | 23 |
| pHY-like6-just-F | GCAGCTCTTGCAGCAGCGGCACAGTCTAAC | 24 |
| pHY-like6-just-CHisR | TAGTTTAATAGATTAGTGGTGGTGGTGGTGTTTGAT TGTTCCCCA | 25 |

Reference Example 1 Preparation of Protease (1) Preparation of Culture Supernatant Containing BLP
(1-1) Preparation of Expression Vector Plasmid pUC57 with the BLP gene (SEQ ID NO: 1) inserted thereto (BLP/pUC57) was prepared using the artificial gene synthesis service from GenScript. PCR was performed using BLP/pUC57 as a template, a primer pair of BLP_S237signal_F and BLP_S237signal_R (SEQ ID NOS: 9 and 10), and PrimeSTAR Max Premix (Takara Bio Inc.). Similarly, PCR was performed using plasmid pHY-S237 described in Example 7 of WO2006/068148 A1 as a template and a primer pair of vector-F and vector-sig-R (SEQ ID NOS: 11 and 12). Each PCR product was treated with DpnI (New England Biolabs). Subsequently, In-Fusion reaction was performed according to the protocol of In-Fusion, HD Cloning Kit (Clontech Laboratories, Inc.).

ECOS™ Competent E. coli DH5α (Nippon Gene, 310-06236) was transformed using the In-Fusion reaction solution. Transformed cells were smeared on an LB plate containing ampicillin and cultured overnight at 37° C. Colonies formed on the plate were inoculated on an LB medium containing ampicillin and cultured overnight. Then, bacterial cells were collected, and plasmid (BLP/pHY) was extracted using High Pure Plasmid Isolation Kit (Roche). PCR was performed using the extracted BLP/pHY as a template and a primer pair of ΔS237N_fw and ΔS237N_rv (SEQ ID NOS: 13 and 14). This PCR product was transformed into E. coli HST08 Premium Competent Cells (Takara Bio Inc.). The transformed cells were smeared on an LB plate containing ampicillin and cultured overnight at 37° C. Colony formed on the plate were inoculated on an LB medium containing ampicillin and cultured overnight. Then, bacterial cells were collected, and plasmid (BLP2/pHY) was extracted using High Pure Plasmid Isolation Kit (Roche).

(1-2) Preparation of Transformed Strain Producing Enzyme

Bacillus subtilis 168 strain (Bacillus subtilis Marburg No. 168 strain: Nature, 390, 1997, p. 249) was inoculated into 1 mL of an LB medium and cultured overnight at 30° C. with shaking at 200 rpm. 10 μL of this culture broth was inoculated into 1 mL of a new LB medium and cultured at 37° C. at 200 rpm for three hours. This culture broth was centrifuged, and pellets were collected. 500 μL of SMMP [0.5 M sucrose, 20 mM disodium maleate, 20 mM magnesium chloride hexahydrate, 35% (w/v) Antibiotic Medium 3 (Difco)] containing 4 mg/mL of lysozyme (SIGMA) was added to the pellets, and the mixture was incubated at 37° C. for one hour. Subsequently, the pellets were collected by centrifugation and suspended in 400 μL of SMMP. 13 μL of the suspension, 2 μL of a solution of the plasmid BLP2/pHY obtained in (1-1) [10 mM Tris-HCl (pH 8.5), 34.2 ng/μL], and 20 μL of SMMP were mixed, 100 μL of 40% PEG was further added thereto, the mixture was stirred, 350 μL of SMMP was further added thereto, and then the mixture was shaken at 30° C. for one hour. 200 μL of this solution was smeared on a DM3 regeneration agar medium [0.8% agar (Wako Pure Chemical Industries, Ltd.), 0.5% disodium succinate hexahydrate, 0.5% Casamino Acids, Technical (Difco), 0.5% yeast extract, 0.35% monopotassium phosphate, 0.15% dipotassium phosphate, 0.5% glucose, 0.4% magnesium chloride hexahydrate, 0.01% bovine serum albumin (SIGMA), 0.5% carboxymethylcellulose, 0.005% trypan blue (Merck), and an amino acid mixture (10 μg/mL each of tryptophan, lysine, and methionine); % is w/v %] containing tetracycline (15 μg/mL, SIGMA) and incubated at 30° C. for three days, formed colonies were obtained.

(1-3) Manufacture of Enzyme Using Culturing Transformed Strain

Tetracycline was added to an LB medium to a final concentration of 15 ppm. The colonies of Bacillus subtilis transformant obtained in (1-2) were inoculated into 5 mL of this medium and then cultured overnight at 30° C. at 250 rpm. On the following day, 400 μL of this culture broth was inoculated into 20 mL of a 2× L-maltose medium (2% tryptone, 1% yeast extract, 1% NaCl, 7.5% maltose, 7.5 ppm manganese sulfate pentahydrate, 15 ppm tetracycline, 6 ppm zinc sulfate heptahydrate; % is w/v %) and cultured at 32° C. at 230 rpm for two days, and a culture supernatant containing an enzyme produced from bacterial cells was collected by centrifugation.

(2) Preparation of Culture Supernatant Containing LasA

Plasmid pUC57 with the LasA gene (SEQ ID NO: 3) inserted thereto (LasA/pUC57) was prepared using the artificial gene synthesis service from GenScript. PCR was performed using LasA/pUC57 as a template and a primer pair of LasA_F and LasA_CR (SEQ ID NOS: 15 and 16) according to the protocol of PrimeSTAR Max Premix (Takara Bio Inc.). Similarly, PCR was performed using the plasmid pHY-S237 described in Example 7 of WO2006/068148 A1 as a template and a primer pair of pHY_just_F and pHY_just_R_NEW (SEQ ID NOS: 17 and 18). Each of the PCR products was treated with DpnI (New England Biolabs). Subsequently, In-Fusion reaction was performed according to the protocol of In-Fusion, HD Cloning Kit (Clontech Laboratories, Inc.), and plasmid (LasA/pHY) solution was obtained.

A Bacillus subtilis strain with enhanced expression of the prsA gene (the prsA-Kc strain prepared in Example 1 of JP-A-2007-49986) was transformed using the obtained plasmid (LasA/pHY) solution, according to the same procedure as above (1-2) to obtain a Bacillus subtilis transformant colonies. Tetracycline was added to a 2×L liquid medium to a final concentration of 15 ppm. The *Bacillus subtilis* transformant colonies were inoculated into 5 mL of this medium, and the mixture was cultured overnight at 30° C. at 250 rpm. Pellets were collected from the culture broth, and the plasmid LasA/pHY was extracted from the pellets. PCR reaction, plasmid digestion with DpnI, and ligation were performed using the extracted plasmid LasA/pHY as a template, a primer pair of LasA_Chis_n_F and LasA-_Chis_n_R (SEQ ID NOS: 19 and 20), and KOD-Plus-Mutagenesis Kit (TOYOBO) to obtain plasmid (LasA2/pHY).

Transformation was performed in the same manner as above (1-2) using the obtained plasmid (LasA2/pHY). At this time, the *Bacillus subtilis* strain with enhanced expression of the prsA gene (the prsA-Kc strain prepared in Example 1 of JP-A-2007-49986) was used as a host. Subsequently, the obtained transformed strain was cultured according to the same procedure as described in (1-3), and a culture supernatant containing an enzyme produced from bacterial cells was collected.

(3) Preparation of Culture Supernatant Containing AhP

Plasmid pUC57 with the AhP gene (SEQ ID NO: 5) inserted (AhP/pUC57) was prepared using the artificial gene synthesis service from GenScript. PCR was performed using AhP/pUC57 as a template and a primer pair of 2F and 2R_bacillus-Chis (SEQ ID NOS: 21 and 22) according to the protocol of PrimeSTAR Max Premix (Takara Bio Inc.). Similarly, PCR was performed using plasmid pHY-5237 described in Example 7 of WO2006/068148 A1 as a template and a primer pair of vector-F and vector-R (SEQ ID NOS: 11 and 23). Each of the PCR products was treated with DpnI (New England Biolabs). Subsequently, In-Fusion reaction was performed according to the protocol of In-Fusion, HD Cloning kit (Clontech Laboratories, Inc.) and a plasmid (AhP/pHY) solution was obtained.

Transformation was performed in the same manner as above (1-2) using the obtained plasmid (AhP/pHY). At this time, the *Bacillus subtilis* 168 strain was used as a host. Subsequently, the obtained transformed strain was cultured according to the same procedure as (1-3), and a culture supernatant containing an enzyme produced from bacterial cells was collected.

(4) Preparation of Culture Supernatant Containing ALE-1

An M23B subfamily protease ALE-1 glycylglycine endopeptidase (ALE-1) (MEROPS ID: M23.012; SEQ ID NO: 8) was prepared. Plasmid pUC57 with the ALE1 gene (SEQ ID NO: 7) inserted thereinto (ALE1/pUC57) was prepared using the artificial gene synthesis service from GenScript. PCR was performed using ALE1/pUC57 as a template, a primer pair of pHY-like6-just-F and pHY-like6-just-CHisR (SEQ ID NOS: 24 and 25), and PrimeSTAR Max Premix (Takara Bio Inc.). Similarly, PCR was performed using plasmid pHY-5237 described in Example 7 of WO2006/068148 A1 as a template and a primer pair of pHY_just_F and pHY_just_R_NEW (SEQ ID NOS: 17 and 18). Each of the PCR products was treated with DpnI (New England Biolabs). Subsequently, In-Fusion reaction was performed according to the protocol of In-Fusion, HD Cloning kit (Clontech Laboratories, Inc.) and a plasmid (ALE1/pHY) solution was obtained.

The *Bacillus subtilis* 168 strain was transformed in the same manner as above (1-2) using the obtained plasmid (ALE1/pHY) to obtain *Bacillus subtilis* transformant colonies. Tetracycline was added to a 2× L liquid medium to a final concentration 15 ppm. The *Bacillus subtilis* transformant colonies were inoculated into 5 mL of this medium, and then the mixture was cultured overnight at 30° C. at 250 rpm. Pellets were collected from the culture broth, and the plasmid ALE1/pHY was extracted from the pellets. Transformation was performed in the same manner as above (1-2) using the extracted plasmid (ALE1/pHY). At this time, the *Bacillus subtilis* Dpr9 strain (Kao9 strain prepared in Examples 1 to 5 of JP-A-2006-174707) was used as a host. The obtained transformed strain was cultured according to a procedure similar to the above (1-3), and a culture supernatant containing an enzyme produced from bacterial cells was collected.

(5) Preparation of Proteases from Culture Supernatant

The target proteases were prepared from the culture supernatants obtained in (1) to (4). The culture supernatant was buffer exchanged with Buffer A using Amicon Ultra fraction with a molecular weight of 10K (Merck Millipore). An enzyme was prepared from the solution after the buffer exchange using AKTA Explorer 10S (GE Healthcare). First, the solution obtained by the buffer exchange was passed through Column 1, and then adsorbed components on the Column 1 were eluted using Buffer B. Among the elution fractions, a fraction solution having a degrading activity on FRET-GGGGG (Reference Example 2) was collected. Subsequently, the collected fraction solution was subjected to Size Exclusion Chromatography using Column 2 equilibrated with a solution of 20 mM Tris-HCl (pH 7.5) and 200 mM NaCl, and a fraction solution having a degrading activity on FRET-GGGGG was collected. The collected fraction solution was buffer exchanged with a 20 mM Tris-HCl (pH 7.5) solution using Amicon Ultra fraction with molecular weight of 10K to obtain an enzyme solution containing the target protease. Buffer A, Buffer B, Column 1, and Column 2 used for each culture supernatant are shown in Table 2.

TABLE 2

|  | BLP | LasA |
|---|---|---|
| BufferA | 10 mM Sodium citrate (pH 6) | 10 mM Sodium citrate (pH 6) |
| BufferB | 10 mM Sodium citrate (pH 6) 200 mM NaCl | 10 mM Sodium citrate (pH 6) 200 mM NaCl |
| Column 1 | TOYOPEARL GigaCap CM-650M (Tosoh Corporation) | TOYOPEARL GigaCap CM-650M (Tosoh Corporation) |
| Column 2 | HiLoad 16/600 Superdex 75 pg (GE Healthcare) | HiLoad 16/600 Superdex 75 pg (GE Healthcare) |
|  | AhP | ALE-1 |
| BufferA | 20 mM Phosphate buffer solution (pH 8) 200 mM NaCl | 20 mM Phosphate buffer solution (pH 8) 200 mM NaCl |
| BufferB | 20 mM Phosphate buffer solution (pH 8) 200 mM NaCl 300 mM Imidazole pH 8 | 20 mM Phosphate buffer solution (pH 8) 200 mM NaCl 300 mM Imidazole pH 8 |
| Column 1 | HisTALON™ Superflow Cartridge (TaKaRa) | HisTALON™ Superflow Cartridge (TaKaRa) |
| Column 2 | TSKgel G4000SWXL (Tosoh Corporation) | TSKgel G4000SWXL (Tosoh Corporation) |

Reference Example 2 Measurement of Enzymatic Activity

An FRET substrate having pentaglycine between a fluorescence group Nma and a quenching group Lys(Dnp) (hereinafter, referred to as FRET-GGGGG) (produced-to-order by PH Japan Co., Ltd.) was used as a substrate. Here, Nma refers to 2-(N-methylamino)benzoyl (Nma). Lys(Dnp) refers to lysine (Lys) having 2,4-dinitrophenyl (Dnp) in the side chain. 190 μL of the enzyme solution [enzyme, 20 mM Tris-HCl (pH 7.5)] obtained in Reference Example 1 (5) was added to a 96-well assay plate (AGC Techno Glass Co., Ltd., 3881-096), and 10 μL of an FRET-GGGGG solution [1 mM FRET-GGGGG, 100 mM Tris-HCl (pH 7.5)] was further added to prepare a reaction solution. The fluorescence intensity of the reaction solution was measured over time using Infinite M200 (TECAN) at a temperature of 30° C., an excitation wavelength of 340 nm, and a measurement wavelength of 440 nm. The fluorescence intensity of a reaction solution prepared by using a 20 mM Tris-HCl pH 7.5 solution instead of the enzyme solution and FRETS-25-STD1 (Peptide Institute, Inc., 3720-v) dissolved with dimethyl sulfoxide instead of FRET-GGGGG under the same reaction conditions was measured to draw a calibration curve. The activity per unit (U) was defined as the quantity of an enzyme necessary to show a change in fluorescence intensity equivalent to the fluorescence intensity for 1 nmol of FRETS-25-STD1 per minute.

Reference Example 3 Measurement of Concentration of Enzyme Solution

The concentration of the enzyme solution was measured using DC Protein Assay Kit (Bio-Rad). BSA Standard Solution (WAKO) was used as a standard solution to calculate the amount of a protein.

Reference Example 4 SDS-PAGE

A 2× Laemmli Sample Buffer (Bio-Rad, #161-0737) containing 50 mM dithiothreitol (Thermo Fisher Scientific) and a sample solution were mixed at an equal amount, and the mixture was heated at 100° C. for five minutes to prepare an electrophoresis sample. This electrophoresis sample was electrophoresed using Any kD™ Mini Protean (registered trade name) TGX™ Precast Gel (Bio-Rad) and 10-fold diluted 10× tris/glycine/SDS (Bio-Rad, #161-0732). Precision Plus Protein™ Dual Color Standards (Bio-Rad, #161-0374) was used as a molecular weight marker. After electrophoresis, the gel was subjected to CBB staining or ruby staining. Bio-Safe CBB G-250 Stain (Bio-Rad, #161-0786) was used for CBB staining. One-step Ruby (APRO life Science, SP-4040) was used for ruby staining. The value obtained by inserting the mobility of a target protein or polypeptide into the formula of the calibration curve drawn using the molecular weight and the mobility of the molecular weight marker is defined as the molecular weight of the target protein or polypeptide. The mobility (Rf value) of a sample was measured as a relative value of the distance from the upper end of the gel (position at which a sample was applied) to the band of the sample when the distance from the upper end of the gel to the preceding dye (bromophenol blue) is 1, in a lane to which the sample was poured.

Reference Example 5 Western Blotting

A keratin solution was subjected to SDS-PAGE (unstained) according to the procedure described in Reference Example 4, and then proteins in the gel were transferred to a PVDF membrane using Trans Blot Turbo™ System (Bio-Rad) and Trans Blot Turbo™ Mini PVDF Transfer Pack (Bio-Rad, #170-4156). iBind Western Device (Thermo Fisher Scientific) was used for an antibody reaction. KRT10 monoclonal antibody (M01), clone 1H6 (Abnova Corporation) was used as a primary antibody, Stabilized Peroxidase Conjugated Goat Anti-Mouse (H+L) (Thermo Fisher Scientific, #32430) was used as a secondary antibody, and ECL Select Western Blotting Detection Reagent (GE Healthcare) was used as a detection reagent.

Example 1 Evaluation of Bactericidal Power of Enzymes Against *Staphylococcus aureus*

(Enzymes)
Enzymes used were a KP43 protease variant (hereinafter also referred to as KP43 protease variant or KP43) and Savinase (registered trade name) (SIGMA, P3111) as alkaline proteases, BLP, LasA, and AhP prepared in Reference Example 1 as M23A subfamily proteases, and ALE-1 prepared in Reference Example 1 and lysostaphin (Wako, #120-04313) as M23B subfamily proteases. The alkaline protease described as SEQ ID NO: 250 in JP-A-2013-233141 was prepared with reference to the manufacturing method described in the publication and used as the KP43 protease variant.

(Evaluation of Bactericidal Power)
*Staphylococcus aureus* (ATCC 6538) was inoculated into 1 mL of an SCD liquid medium (Nihon Pharmaceutical Co., Ltd., 393-00185), and the mixture was cultured overnight at 37° C. with shaking. Bacterial cells were collected, washed with 20 mM Tris-HCl (pH 7.5), and a solution was prepared with 20 mM Tris-HCl (pH 7.5) at OD600=0.5 ($10^8$ cfu/mL). 5 μL of the bacterial solution was added to 495 μL of a test solution (20 mM Tris-HCl (pH 7.5)+1 μg/mL for each enzyme), and the mixture was left stand at 30° C. for 30 minutes. After left stand, the mixture solution was serially diluted with an LP dilution solution (Nihon Pharmaceutical Co., Ltd., 397-00281), and 100 μL of the diluted solution was applied to an SCD agar medium (Nihon Pharmaceutical Co., Ltd., 396-00175). After bacterial cells were cultured overnight at 37° C., and then the number of colonies was counted.

The viable cell count was calculated by the following formula:

$$\text{Viable cell count(cfu/mL)} = \text{dilution factor} \times \text{number of colonies} \times 10$$

The results of evaluation of the bactericidal power are shown in FIG. 1. The bactericidal property against *Staphylococcus aureus* was not observed for the KP43 protease variant or Savinase (registered trade name). In contrast, the bactericidal property against *Staphylococcus aureus* was observed for BLP, LasA, AhP, ALE-1, and lysostaphin.

Example 2 Evaluation of Detergency of Enzymes Against Corneum-Derived Stains (Preparation of Collar and Cuff Stains)
A fabric (composition: 65% polyester and 35% cotton) was sewed onto a collar region of a dress shirt. This shirt was worn by an adult man during the daytime for three days. Then, the fabric sewed to the collar was collected and cut into a square of 6 mm by 6 mm, and the piece was used as a fabric sample having collar and cuff stains.

(Evaluation of Detergency)
Composition of detergent solution: enzyme, 20 mM Tris-HCl (pH 7.5), a degree of hardness of 10° dH [calcium/magnesium=4/1 (mole ratio)], 0.1% (w/v) polyoxyethylene sodium lauryl ether sulfate (Emal (registered trade name) 20C, Kao Corporation, active component conversion). BLP, LasA, AhP, ALE-1, and lysostaphin (Wako, 120-04313), i.e., the enzymes for which the bactericidal property against *Staphylococcus aureus* was confirmed in Example 1, were used as enzymes. Each enzyme was added at a final concentration of 150 U/L. A detergent solution having the same composition with no enzyme added was used as a control.

The image of the fabric sample was captured using a scanner GT-X970 (EPSON). Then, the fabric sample was immersed in 500 µL of the detergent solution and left stand at 30° C. for five hours. After left stand, the fabric sample was rinsed with water with a degree of hardness of 10° dH and then dried, and the image was captured again using the scanner GT-X970. The mean gray values of the fabric sample before and after washed were measured from the captured images using an image analysis software ImageJ. The image of the original fabric before stains were attached was captured in a similar manner, and the mean gray value thereof was measured. The washing rate was calculated by inserting the obtained mean gray values into the following formula:

Washing rate (%)=(G2−G1)/(G0−G1)×100

G0: Mean gray value of the original fabric of the fabric sample
G1: Mean gray value of the fabric sample before washed
G2: Mean gray value of the fabric sample after washed The measurement results of the washing rates are shown in FIG. 2. The M23A subfamily proteases BLP, LasA, and AhP were found to have detergency against collar and cuff stains. In contrast, detergency against collar and cuff stains was not detected for M23B subfamily proteases ALE-1 and lysostaphin.

Example 3 Enhancement of Detergency by Using BLP and Alkaline Protease in Combination The detergency against collar and cuff stains of BLP and an alkaline protease used in combination was measured.
(Preparation of BLP)
Achromopeptidase-derived β-lytic protease (A-BLP) was prepared by the method described below. Achromopeptidase (Wako Pure Chemical Industries, Ltd., 014-09661) was dissolved in a 10 mM citrate buffer (pH 6.0), and the mixture was applied to the cation exchange column TOYOPEARL GigaCap CM-650M (Tosoh Corporation) equilibrated with the same buffer to elute with a gradient from 0 to 500 mM NaCl concentration. Among eluates, a fraction solution showing a degrading activity on FRET-GGGGG was collected. The obtained fraction solution was applied to Size Exclusion Chromatography using 20 mM Tris-HCl (pH 7.5) and column TSK gel G4000SWXL (Tosoh Corporation) equilibrated with 200 mM NaCl, and a fraction solution showing a degrading activity on FRET-GGGGG was collected. The collected fraction solution was buffer exchanges with a 20 mM Tris-HCl solution (pH 7.5) using Amicon Ultra with fraction molecular weight of 10K to prepare an A-BLP solution.

Dithiothreitol (Thermo Fisher Scientific) was mixed with a 2× Laemmli Sample Buffer (Bio-Rad, #161-0737) to the final concentration of 25 mM and then mixed with an equal volume of the above-described A-BLP solution. The obtained mixture solution was heated at 100° C. for five minutes and then subjected to SDS-PAGE using Any kD™ Mini Protean (registered trade name) TGX™ Precast gel (Bio-Rad). Precision Plus protein TMDual Color Standards (Bio-Rad, #161-0374) was used as a molecular weight marker. After SDS-PAGE, the proteins in the gel were transferred to the PVDF membrane using Trans Blot Turbo™ System (Bio-Rad) and Trans Blot Turbo™ Mini PVDF Transfer Pack (Bio-Rad, #170-4156). The membrane was stained with Bio-Safe CBB G-250 stain (Bio-Rad, #161-0786) and decolorized with a 50% methanol solution, and the region of the obtained band was excised. The analysis of the N-terminus amino acid sequence of the excised membrane was requested to the N-terminus amino acid sequence analysis service of Leave a Nest Co., Ltd. The results of the analysis showed that the N-terminus amino acid sequence was SPNGLLQFPF. This sequence matched the N-terminus sequence of the mature region (SEQ ID NO: 2) of BLP published in β-lytic metallopeptidase [UniProt Knowledgebase_P00801].
(Alkaline Protease)

The alkaline protease (KP43 protease variant, or KP43) described as SEQ ID NO: 250 in JP-A-2013-233141 was prepared with reference to the manufacturing method described in the publication and used as an alkaline protease.
(Evaluation of Detergency)

Composition of the detergent solution: 1 µg/mL enzyme, 20 mM Tris-HCl (pH 7.5), a degree of hardness of 10° dH [calcium/magnesium=4/1 (mole ratio)], 0.1% (w/v) polyoxyethylene sodium lauryl ether sulfate (Emal (registered trade name) 20C, Kao Corporation, active component conversion). The above-mentioned A-BLP, KP43 protease variant, or mixtures thereof [KP43:A-BLP (mass ratio)=10:0, 7.5:2.5, 2.5:7.5, 0:10] were used as an enzyme. When enzymes were used in combination, the detergent solution was prepared so that the total enzyme concentration was 1 µg/mL.

According to the procedure similar to Example 2, the rate of washing collar and cuff stains by the detergent solution was measured. The results are shown in FIG. 3. A higher detergency against collar and cuff stains was obtained using the alkaline protease and BLP in combination than using the alkaline protease or BLP alone. Further, the detergency was further improved as the mixing ratio of BLP to the alkaline protease was increased from ⅓ (KP43:A-BLP=7.5:2.5) to 3 (KP43:A-BLP=2.5:7.5).

Example 4 Evaluation of Keratin Degrading Activity of Enzymes (1) Preparation of Keratin Solution
The corneum was scraped off from the human heel using Velvet Smooth Electric Horny Remover Diamond (Reckitt Benckiser). 1 mL of a solubilizing solution [100 mM Tris-HCl (pH 8.5), 2% SDS, 25 mM DTT, 5 mM EDTA] was added to 5 mg of the heel corneum, the mixture was heated at 100° C. for 10 minutes and then centrifuged, and the supernatant was collected. The collected supernatant was dialyzed overnight against a dialysis buffer [20 mM Tris-HCl (pH 7.5), 0.1% SDS] using Mini Dialysis kit 8 kDa cut-off 2 mL (GE HEALTHCARE, #80-6484-32) to obtain a keratin solution.
(2) Enzymatic Degradation of Keratin The keratin solution obtained in (1) was diluted 20-fold with 20 mM Tris-HCl (pH 7.5). 1 µL of an enzyme solution was added to 30 µL of this diluted solution. BLP, LasA, AhP and ALE-1 prepared in Reference Example 1, lysostaphin (Wako, #120-04313), Savinase (registered trade name) (SIGMA, P3111), Alcalase (registered trade name) (SIGMA, P4860), and proteinase K (Kanto Chemical Co., Inc., 34076-92) were used as enzymes. The solutions of BLP, Savinase (registered trade name), Alcalase (registered trade name), and proteinase K were prepared to a final enzyme concentration of 1 µg/mL, and the solutions of LasA, AhP, ALE-1, and lysostaphin were prepared to a final enzyme concentration of 10 µg/mL. The reaction solution was left stand at 30° C. for 15 hours and evaluated by SDS-PAGE (CBB staining) according to the procedure in Reference Example 4.

The results are shown in FIG. 4. For the solutions containing M23A subfamily enzymes BLP, LasA, and AhP, bands were detected between the molecular weight marker of 37,000 and the molecular weight marker of 50,000, indicating that these enzymes had degraded keratin. In contrast, degradation of keratin was not observed for the solutions containing M23B subfamily enzymes ALE-1 and lysostaphin. In other words, it was shown that, among M23 family enzymes, only M23A subfamily enzymes degraded keratin. Additionally, major bands were lost for the solutions containing Savinase (registered trade name), Alcalase (registered trade name), and proteinase K. It was likely that the band of the keratin fragment had not been detected for these enzymes because keratin was degraded to fragments with various molecular weights which were below the detection limit or the keratin was degraded into low-molecule fragments and was flown out of the gel.

(3) Evaluation of Keratin Fractions

The keratin solution obtained in (1) was diluted 20-fold with 20 mM Tris-HCl (pH 7.5) and evaluated by SDS-PAGE (CBB staining) and western blotting according to a procedure similar to Reference Examples 4 and 5. The results of evaluation by SDS-PAGE and western blotting demonstrated that the keratin solution prepared from the heel corneum contained keratin 10 (FIG. 5). In FIG. 5, a plurality of bands were detected, but these bands were considered to be keratin 10 complex, modified keratin 10, keratin 1, and other types of keratin in addition to keratin 10 monomer.

Example 5 Degradation of Corneocyte-Derived Insoluble Keratin by M23A Subfamily Proteases The corneum was collected from the human neck by tape stripping using 2 cm of a tape (Nichiban Co., Ltd., CT-24). A solubilizing solution [100 mM Tris-HCl (pH 8.5), 2% SDS, 25 mM DTT, 5 mM EDTA] was added to this corneum, the mixture was heated at 100° C. for 10 minutes and then centrifuged, and the supernatant was removed to obtain precipitates. The procedure of adding the solubilizing solution to the precipitates, heating and centrifuging the mixture was repeated twice more to obtain corneocyte-derived insoluble components. 40 μL of 20 mM Tris-HCl (pH 7.5) was added to the obtained insoluble components, and 1 μL of an enzyme solution was further added. BLP, LasA, and AhP prepared in Reference Example 1 were used as enzymes. The solution of BLP was prepared to a final enzyme concentration of 1 μg/mL, and the solutions of LasA and AhP were prepared to a final enzyme concentration of 10 μg/mL. The reaction solution was left stand at 30° C. for 15 hours, and then SDS-PAGE (ruby staining) of the supernatant was performed according to the procedure in Reference Example 4. The results are shown in FIG. 6. A band was detected between the molecular weight marker of 37,000 and the molecular weight marker of 50,000 for all the solutions containing BLP, LasA, and AhP, indicating that these enzymes had degraded keratin in the insoluble corneum fraction.

Example 6 Analysis of Substrates of M23A Subfamily Proteases

As shown in FIGS. 4 and 6, two bands were detected between the molecular weight marker of 37,000 and the molecular weight marker of 50,000 in SDS-PAGE of the keratin solutions treated with the M23A subfamily proteases. Of these, the SDS-PAGE sample of the BLP-treated solution shown in FIG. 6 was subjected to mass spectrometry for the band on the lower molecule side. In the mass spectrometry, MALDI-TOF Mass Spec Analysis of Leave a Nest Co., Ltd. was used. The results of the mass spectrometry showed that the proteins contained in this band region were fragments of keratin 10 (ACCESSION_AAH34697).

FIG. 7 shows the amino acid sequence (SEQ ID NO: 28) of keratin 10. The bold letters indicate the peptide sequences in the band from the enzyme-treated solution identified in mass spectrometry. As shown in FIG. 7, glycine-rich regions were present at both ends of keratin 10, whereas the peptide sequence (bold letters) detected in mass spectrometry in this Example was located in the central region. The peptide sequence detected in the mass spectrometry was present between positions 157 and 450 in the amino acid sequence of keratin 10. Taken together, it was found that BLP and other M23A subfamily enzymes cleaved the glycine-rich regions at both ends of the amino acid sequence of keratin 10, which are the amino acid region at positions 1 to 156 or the amino acid region at positions 451 to 584, thereby degrading full-length keratin 10 contained in the corneum.

Example 7 Evaluation of Property of Degrading Wool Keratin

The property of an enzyme for degrading wool keratin (damaging property) was evaluated using keratin azure, which uses wool as a raw material (SIGNA, K8500, lot; SLBM2921V). Savinase (registered trade name) (SIGMA, P3111), Alcalase (registered trade name) (SIGMA, P4860), and proteinase K (Kanto Chemical Co., Inc., 34076-92), as well as BLP, LasA, and AhP prepared in Reference Example 1, were used as enzymes. 6 mg of keratin azure was immersed in 1 mL of a 20 mM Tris-HCl solution (pH 7.5), and 100 μL of an enzyme solution adjusted to 100 μg/mL was added. The mixture was left stand at room temperature for 72 hours and then centrifuged to collect a supernatant, and absorbance at a wavelength of 595 nm was measured using Infinite M200 (TECAN). The value obtained by subtracting the absorbance of the supernatant from the solution not containing the enzyme from the absorbance of the supernatant from the solution containing the enzyme was defined as ΔA595.

The results are shown in FIG. 8. The absorbance of the samples containing Savinase (registered trade name), Alcalase (registered trade name), or proteinase K was increased compared with that of the samples containing BLP, LasA, or AhP. Taken together, it was found that Savinase (registered trade name), Alcalase (registered trade name), and proteinase K degraded the wool-derived keratin azure more efficiently, that is, had a higher wool damaging property than BLP, LasA, and AhP.

Examples 2 and 4 to 6 indicated that enzymes which were able to degrade glycine rich regions in keratin 10 had detergency against corneum-derived stains. Further, Examples 6 and 7 showed that enzymes which degraded glycine-rich regions in keratin 10 but could not degrade the central region of keratin 10 had a low property of degrading wool keratin. It appears because proteins constituting animal fibers do not have so many glycine rich regions as keratin 10. Therefore, it was indicated that the ability to degrade corneum-derived stains and the ability to degrade animal fibers (damaging property) of an enzyme could be evaluated using the property of degrading a glycine rich region as a criterion.

Example 8 Loricrin-Degrading Activity of BLP

A solution of recombinant loricrin fused with a tag sequence (Recombinant Human Loricrin Protein; Abcam, ab114261) was prepared as a reaction solution [20 mM Tris-HCl (pH 7.5), a degree of hardness 10° dH (calcium/magnesium=4/1 [mole ratio]], 0.1% (w/v) polyoxyethylene sodium lauryl ether sulfate] using Amicon Ultra with fraction molecular weight of 10K (Merck Millipore). 1 µL of the BLP solution (60 µg of enzyme/mL) prepared in Reference Example 1 was added to 30 µL of this solution, and the mixture was left stand at 30° C. for three hours. After the reaction, three major bands were detected (FIG. 9, see the arrows) for the solution in the results of SDS-PAGE (CBB staining) according to the procedure in Reference Example 4.

After SDS-PAGE (unstained), proteins in the gel similarly prepared were transferred to the PVDF membrane using Trans Blot Turbo™ System (Bio-Rad) and Trans Blot Turbo™ Mini PVDF Transfer Pack (Bio-Rad, #170-4156). The membrane to which the proteins had been transferred was stained with Bio-Safe CBB G-250 Stain (Bio-Rad, #161-0786) and decolorized with a 50% methanol solution, and then a region of three bands which appeared at positions similar to those in FIG. 9 was excised. The analysis of the N-terminus amino acid sequence of the excised bands was requested to the N-terminus amino acid sequence analysis service of Leave a Nest Co., Ltd. Given that the results showed that none of the N-terminus amino acid sequences of the bands were the sequence of loricrin, the bands were inferred to be derived from the tag sequence. That is, BLP was shown to have degraded loricrin.

FIG. 10 shows the amino acid sequence (SEQ ID NO: 29) of loricrin used in this Example. As shown in FIG. 10, loricrin is a glycine rich protein. However, there are almost no glycine rich regions in the tag sequence used in this Example (not shown in FIG. 10). Therefore, the results of this Example and the results of Example 6 taken together indicated that BLP had degraded loricrin by degrading the glycine-rich regions.

Example 9 Substrate Specificity of Corneum-Derived Stains-Degrading Enzyme

Various enzymes were investigated for differences in substrate specificity depending on the corneum-derived stains-degrading ability. The degrading activities of proteases on various substrate peptides were investigated according to the same procedure as in Reference Example 2, except using FRET substrates each containing one of five types of peptides GGGGG, GGGSG, GGGYG, GGGLG, and GGGFG (SEQ ID NOS: 30, 32 to 35) as peptide sequences. BLP, LasA, AhP, and ALE-1 prepared in Reference Example 1 and lysostaphin (Wako, 120-04313) were used as proteases. Further, the concentration of each protease solution was measured by the method in Reference Example 5. The activity per mg of enzyme (specific activity; U/mg) was obtained for each protease.

The results are shown in Table 3. The M23A subfamily proteases (BLP, LasA, and AhP) which degraded corneum-derived stains in Example 2 had a specific activity on the FRET substrate GGGGG being 10 U/mg or higher. Further, the relative activities of any one or more of the FRET substrates GGGSG, GGGYG, GGGLG, and GGGFG based on the FRET substrate GGGGG exceeded 0.5. Meanwhile, the M23B subfamily proteases which did not degrade corneum-derived stains in Example 4 (ALE-1 and lysostaphin) had a specific activity on the FRET substrate GGGGG being lower than 10 U/mg. Further, no activity was observed on any of FRET substrates GGGSG, GGGYG, GGGLG, and GGGFG, and the relative activity based on the FRET substrate GGGGG was lower than 0.5.

TABLE 3

| | Specific activity (U/mg) | | | | |
|---|---|---|---|---|---|
| | GGGGG | GGGSG | GGGYG | GGGLG | GGGFG |
| BLP | 186 | 231 | 74 | 3 | 83 |
| LasA | 19 | 19 | 29 | 10 | 19 |
| AhP | 53 | 10 | 98 | 31 | 51 |
| ALE1 | 3 | 0 | 0 | 0 | 0 |
| Lysostaphin | 3 | 0 | 0 | 0 | 0 |

From the above results of the Examples, when GGGGG is used as the reference peptide, and GGGSG, GGGYG, GGGLG, and GGGFG are used as the substrate peptides, enzymes having the ability to degrade corneum-derived stains were found to have a specific activity on the reference peptide being 10 U/mg or higher and degrading activities on any one or more substrate peptides being 5 U/mg or higher (relative activities are 0.5 or higher). Therefore, it was indicated that the ability of an enzyme to degrade corneum-derived stains could be evaluated using enzyme activities on various glycine-rich reference peptides and substrate peptides as criteria. It was further indicated that, by checking the keratin degrading behavior, the damaging property against animal fibers could be evaluated in addition to the ability to degrade corneum-derived stains. Thus, by using the method of the present invention, enzymes having the ability to degrade corneum-derived stains can be efficiently screened for, and enzymes having the ability degrade corneum-derived stains and a low damaging property against animal fibers can also be efficiently screened for.

The embodiments of the present invention have been explained above, but it should be construed that these embodiments are not intended to limit the present invention to the explained specific embodiments. Various other modifications and corrections within the scope of the present invention are apparent to those skilled in the art. Descriptions in the literatures and the patent applications cited in the present specification are incorporated as reference as if they were completely stated in the present specification.

What is claimed is:

1. A method for washing corneum-derived stains comprising bringing an object to be washed into contact with an M23A subfamily protease.

2. The method according to claim 1, wherein the corneum-derived stains are collar and cuff stains.

3. The method according to claim 1, wherein the M23A subfamily protease has a specific activity for degrading a reference peptide being 10 U/mg or higher and relative value of the degrading activity on each of one or more substrate peptides based on the degrading activity on the reference peptide being 0.5 or higher, wherein the reference peptide is GGGGG or GGGG, the substrate peptide is one or more selected from the group consisting of GGGXG, GXGGG, GGXG, and GXGG, and X is any amino acid residue other than glycine.

4. The method according to claim 1, wherein the M23A subfamily protease is at least one selected from the group consisting of β-lytic metalloprotease, LasA protein, and Aeromonas hydrophila proteinase.

5. The method according to claim 1, wherein the method comprises bringing the object to be washed into contact with an enzyme composition comprising the M23A subfamily protease.

6. The method according to claim 5, wherein the corneum-derived stains are collar and cuff stains.

7. The method according to claim 5, wherein the M23A subfamily protease has a specific activity for degrading a reference peptide being 10 U/mg or higher and relative value of the degrading activity on each of one or more substrate peptides based on the degrading activity on the reference peptide being 0.5 or higher, wherein the reference peptide is GGGGG or GGGG, the substrate peptide is one or more selected from the group consisting of GGGXG, GXGGG, GGXG, and GXGG, and X is any amino acid residue other than glycine.

8. The method according to claim 5, wherein the M23A subfamily protease is at least one selected from the group consisting of β-lytic metalloprotease, LasA protein, and Aeromonas hydrophila proteinase.

9. The method according to claim 5, wherein the enzyme composition is prepared from Achromopeptidase.

10. The method according to claim 5, wherein the enzyme composition further comprises at least one selected from the group consisting of a protease other than the M23A subfamily protease, cellulase, amylase, and lipase.

11. The method according to claim 10, wherein the protease other than the M23A subfamily protease is an alkaline protease.

12. The method according to claim 11, wherein the alkaline protease is an alkaline protease derived from bacteria belonging to the genus Bacillus.

13. The method according to claim 12, wherein the alkaline protease is at least one selected from the group consisting of an alkaline protease consisting of the amino acid sequence set forth in SEQ ID NO: 26 or an amino acid sequence having at least 80% identity thereto and an alkaline protease consisting of the amino acid sequence set forth in SEQ ID NO: 27 or an amino acid sequence having at least 80% identity thereto.

14. The method according to claim 11, wherein the mass ratio of the M23A subfamily protease to the alkaline protease is 1/20 or higher.

15. The method according to claim 1, wherein the method comprises soaking the object to be washed in water in which the M23A protease is dissolved.

16. The method according to claim 5, wherein the method comprises soaking the object to be washed in water in which the enzyme composition is dissolved.

* * * * *

SEQUENCE LISTING

<160> NUMBER OF SEQ ID NOS: 35

<210> SEQ ID NO 1
<211> LENGTH: 1134
<212> TYPE: DNA

<213> ORGANISM: Achromobacter lyticus

<400> SEQUENCE: 1

```
atgaaaaaaa tctcaaaagc tggtctggga ctggctctgg tctgtgctct ggcgacgatt        60
ggaggcaacg catctgctca gggacatgga ttaagcggcg aagatctggt ttactcttac       120
gatgaaatgt ttgattttga tatcgatgcc tacctggcaa acatgcgcc  gcatctgcat       180
aaacatagcg aagaaatctc tcattgggcc ggatattctg gcatttcacc gaaagttctt       240
atcgcattaa tggaacaaca gtcaggagct gtgagcgcca aaagagcaac aaatcgcccg       300
tttggcaaac ttgccagagc agatggattt ggcgcccaaa cacgcgaagt ggcgttagct       360
ctgagagaat ctcttttatga cgcgatccg  gatggagcca aaggcccggt cacattagcc       420
agagcaaacc cgctgcaggc acttttttgaa cgctcaggag ataatgaacc ggcagcggct       480
ttaagaggag atggcgaatt caacttgtc  tacggcagat tatttaacga accgcgccag       540
gcaaaagccg caagcgatag atttgcgaaa gctggaccgg atgttcaacc gttatctccg       600
aatggactgc ttcagtttcc gtttccgaga ggcgcatctt ggcatgtggg cggagctcat       660
acaaacacag gatcaggcaa ttatccgatg tcaagcctgg atatgtcaag aggcggaggc       720
tggggaagca atcaaaacgg caattgggtt tcagcgagcg cggctggatc ttttaaacgc       780
cattcttcat gctttgctga aattgttcat acaggcggct ggtcaacaac atactaccat       840
ctgatgaaca tccagtacaa tacaggcgcg aacgttagca tgaatacagc catcgcaaac       900
ccggctaata cacaagcgca ggctctgtgc aacggaggcc aaagcacagg accgcatgaa       960
cattggtcac tgaaacagaa cggctcattt taccatctga acggaacata cctttcaggc      1020
tatagaatca cagcgacagg cagctcttat gatacaaatt gtagccgctt ttatttgaca      1080
aaaaatggac agaactactg ctatggttat tatgtgaatc tggaccgaa  ctaa             1134
```

<210> SEQ ID NO 2
<211> LENGTH: 179
<212> TYPE: PRT
<213> ORGANISM: Achromobacter lyticus
<220> FEATURE:
<223> OTHER INFORMATION: beta-lytic metallopeptidase (BLP) mature
      protein

<400> SEQUENCE: 2

```
Ser Pro Asn Gly Leu Leu Gln Phe Pro Phe Pro Arg Gly Ala Ser Trp
1               5                   10                  15

His Val Gly Gly Ala His Thr Asn Thr Gly Ser Gly Asn Tyr Pro Met
            20                  25                  30

Ser Ser Leu Asp Met Ser Arg Gly Gly Gly Trp Gly Ser Asn Gln Asn
        35                  40                  45

Gly Asn Trp Val Ser Ala Ser Ala Ala Gly Ser Phe Lys Arg His Ser
    50                  55                  60

Ser Cys Phe Ala Glu Ile Val His Thr Gly Gly Trp Ser Thr Thr Tyr
65                  70                  75                  80

Tyr His Leu Met Asn Ile Gln Tyr Asn Thr Gly Ala Asn Val Ser Met
                85                  90                  95

Asn Thr Ala Ile Ala Asn Pro Ala Asn Thr Gln Ala Gln Ala Leu Cys
            100                 105                 110

Asn Gly Gly Gln Ser Thr Gly Pro His Glu His Trp Ser Leu Lys Gln
        115                 120                 125

Asn Gly Ser Phe Tyr His Leu Asn Gly Thr Tyr Leu Ser Gly Tyr Arg
    130                 135                 140
```

Ile Thr Ala Thr Gly Ser Ser Tyr Asp Thr Asn Cys Ser Arg Phe Tyr
145                 150                 155                 160

Leu Thr Lys Asn Gly Gln Asn Tyr Cys Tyr Gly Tyr Tyr Val Asn Pro
            165                 170                 175

Gly Pro Asn

<210> SEQ ID NO 3
<211> LENGTH: 1257
<212> TYPE: DNA
<213> ORGANISM: Pseudomonas aeruginosa

<400> SEQUENCE: 3
atgcaacata aaagaagccg tgcgatggcg agcccgagaa gcccgttcct gtttgtgctg      60
ctggccctgg cggtgggtgg tactgccaac gcgcatgatg atggcctgcc ggcatttcgt     120
tattcagccg aactgctggg tcaactgcag ctgccgtctg tggcactgcc gctgaatgat     180
gacctgtttc tgtatggccg tgatgcgaaa gcatttgatc tggaagcgta tctggcactg     240
aatgcaccgg cactgcgtga taaaagcgaa tatctggaac attggtcagg ctattattct     300
attaatccga aagttctgct gacactgatg gtcatgcaaa gcggtccgct gggtgcaccg     360
gatgaacgtg cactggcagc accgctgggc cgtctgtcag ccaaacgcgg ttttgatgcg     420
caggtgcgcg atgttctgca gcagctgtct cgccgttatt atggctttga agaatatcaa     480
ctgcgccagg cagcagcacg taaagcagtt ggcgaagatg gtctgaatgc agcatctgca     540
gcgctgctgg gcctgctgcg tgaaggtgca aaagtcagcg cagtgcaggg cggtaatccg     600
ctgggtgcat atgcccagac ctttcagcgc ctgtttggta caccggcggc agaactgctg     660
cagccgtcaa atcgtgttgc acgtcaactg caggcaaaag cggcactggc accgccgagc     720
aacctgatgc agctgccgtg gcgtcagggc tattcatggc agccgaatgg tgcacatagc     780
aacacgggct caggttatcc gtatagctca tttgatgcca gctatgattg gccgcgttgg     840
ggctctgcaa cctatagcgt ggttgcagcc catgcgggta cagtccgcgt gctgtctcgt     900
tgccaagttc gtgtcacaca tccgtctggt tgggcaacca attattatca tatggatcag     960
attcaggtga gcaacggtca gcaggtttca gcagatacga aactgggcgt ttatgcaggt    1020
aatatcaaca gcccctgtg cgaaggcggt tctagcacgg gccgcatcct gcattttcct    1080
ctgctgtata tggtgcgtt tgtctcactg cagggcgcat cttttggtcc gtatcgcatc    1140
aacgtgggca ccagcaatta tgataacgat tgtcgccgtt attacttcta caatcagtct    1200
gctggaacaa cccactgtgc ctttagaccg ctgtataatc cgggactggc tctgtaa      1257

<210> SEQ ID NO 4
<211> LENGTH: 182
<212> TYPE: PRT
<213> ORGANISM: Pseudomonas aeruginosa
<220> FEATURE:
<223> OTHER INFORMATION: Las A protein (LAS) mature protein

<400> SEQUENCE: 4

Ala Pro Pro Ser Asn Leu Met Gln Leu Pro Trp Arg Gln Gly Tyr Ser
1               5                   10                  15

Trp Gln Pro Asn Gly Ala His Ser Asn Thr Gly Ser Gly Tyr Pro Tyr
            20                  25                  30

Ser Ser Phe Asp Ala Ser Tyr Asp Trp Pro Arg Trp Gly Ser Ala Thr
        35                  40                  45

Tyr Ser Val Val Ala Ala His Ala Gly Thr Val Arg Val Leu Ser Arg

```
            50                  55                  60
Cys Gln Val Arg Val Thr His Pro Ser Gly Trp Ala Thr Asn Tyr Tyr
 65                  70                  75                  80

His Met Asp Gln Ile Gln Val Ser Asn Gly Gln Val Ser Ala Asp
                 85                  90                  95

Thr Lys Leu Gly Val Tyr Ala Gly Asn Ile Asn Thr Ala Leu Cys Glu
                100                 105                 110

Gly Gly Ser Ser Thr Gly Pro His Leu His Phe Ser Leu Leu Tyr Asn
            115                 120                 125

Gly Ala Phe Val Ser Leu Gln Gly Ala Ser Phe Gly Pro Tyr Arg Ile
        130                 135                 140

Asn Val Gly Thr Ser Asn Tyr Asp Asn Asp Cys Arg Arg Tyr Tyr Phe
145                 150                 155                 160

Tyr Asn Gln Ser Ala Gly Thr Thr His Cys Ala Phe Arg Pro Leu Tyr
                165                 170                 175

Asn Pro Gly Leu Ala Leu
            180
```

<210> SEQ ID NO 5
<211> LENGTH: 1164
<212> TYPE: DNA
<213> ORGANISM: Aeromonas hydrophila

<400> SEQUENCE: 5

```
atgtctcgtc cgatcccgtc cctgctgatg ctggctctgc tgccggctgc tggtttgggct    60
ggcgatattc acgctccgct ggctccgtat cattttacgg cgcagcaact ggcagcatct   120
caaaccccgg cactgccgct ggatgaagca cattttgttt ttggcgaagc cgcgatggca   180
tttgatctgc atgattttct gctgcagcag gccccgcatc tgctgccgaa agaagaagtc   240
attctgcatt ggagcggtat cacgtcactg aatccgcagc tgctgctggc cctgatggaa   300
gcgagctcac agctgatttc agcaccgtct gaacaggcca tggcagcccc gtttgcgaaa   360
ctggtgaatg cacgtggctt tgataaccag ctggaactga tggcccgcca gctgtctgaa   420
cgttttttatc aggcacgcgc ccagcagaaa ctgatgcaac gttctgcacc ggcactggcc   480
ccgcaggcgg cacatcaggc cgcgctggca tcaatgctgt ctaccagcat gcagcgtcag   540
ctgggcgaac agtggcagac cctgtttggt caagatgcaa tgacaagccc gcgcggcggt   600
gcagcagcac cggcagcccc gctggcaggc ggtcaatttc agctgccgtg cgtcagggc   660
tattcttgga aagcgaatgg tgcacattct catacaggca gcggttatcc gtattctagc   720
atcgatgtca gctatgattg gccgggttgg ggcggtgcga cctatacagt gacggcggca   780
aactcaggta ccgtgacagt gtttagccgt tgccaggtcc gtgtgacagc aaccaatggc   840
tgggcgacaa actattatca tatgagcggc atttcagtgc gttctggtga ttatgttgcc   900
gcggatacac cgatcggcac gtatgcctca aatcgcaacg aagcgctgtg cgaaggcgt   960
tcatctacgg gtccgcatct gcattttagc ctgctgtata atggcgtttt tcagtcactg  1020
cagggtcagc gtctgagctc atatgcagtt aatgtcggcg ccagcaacta tgatgataat  1080
tgtaaccgct tttggctgta taaccaaaga aacggacaac gctactgtgc ttggcaaccg  1140
ctgtataata acggaatcga ctaa                                          1164
```

<210> SEQ ID NO 6
<211> LENGTH: 179
<212> TYPE: PRT
<213> ORGANISM: Aeromonas hydrophila
<220> FEATURE:
<223> OTHER INFORMATION: Aeromonas hydrophila proteinase (AhP) mature
    protein

<400> SEQUENCE: 6

```
Ala Gly Gly Gln Phe Gln Leu Pro Trp Arg Gln Gly Tyr Ser Trp Lys
1               5                   10                  15
Ala Asn Gly Ala His Ser His Thr Gly Ser Gly Tyr Pro Tyr Ser Ser
            20                  25                  30
Ile Asp Val Ser Tyr Asp Trp Pro Gly Trp Gly Ala Thr Tyr Thr
        35                  40                  45
Val Thr Ala Ala Asn Ser Gly Thr Val Thr Val Phe Ser Arg Cys Gln
    50                  55                  60
Val Arg Val Thr Ala Thr Asn Gly Trp Ala Thr Asn Tyr Tyr His Met
65                  70                  75                  80
Ser Gly Ile Ser Val Arg Ser Gly Asp Tyr Val Ala Ala Asp Thr Pro
                85                  90                  95
Ile Gly Thr Tyr Ala Ser Asn Arg Asn Glu Ala Leu Cys Glu Gly Gly
            100                 105                 110
Ser Ser Thr Gly Pro His Leu His Phe Ser Leu Leu Tyr Asn Gly Val
        115                 120                 125
Phe Gln Ser Leu Gln Gly Gln Arg Leu Ser Ser Tyr Ala Val Asn Val
    130                 135                 140
Gly Ala Ser Asn Tyr Asp Asp Asn Cys Asn Arg Phe Trp Leu Tyr Asn
145                 150                 155                 160
Gln Arg Asn Gly Gln Arg Tyr Cys Ala Trp Gln Pro Leu Tyr Asn Asn
                165                 170                 175
Gly Ile Asp
```

<210> SEQ ID NO 7
<211> LENGTH: 1089
<212> TYPE: DNA
<213> ORGANISM: Staphylococcus capitis

<400> SEQUENCE: 7

```
atggatacta atcgtaaatt cactctggta aaatctctga gcatcggact gggcactttc      60
ctggttggta gcgtctttct gaccgtcaac gatgaagcca gcgcgtcaac gaaagtggat     120
gcgccgaaag ttgaacagga agcaccggcc aaagcggatg caccgaaagt ggaacaggaa     180
gccccggcga agcagatgc cccgaaagtc gaacaggaag cgccggcaaa agtcgatgcc      240
ccgaaagtag aacaggaagc cccggcaaaa gttgatgcgc taaggtagaa caggaagca      300
ccggcaaaag cagacgcacc gaaagtcgaa cagaaacgca cctttgtgcg tgaagcggca     360
cagtctaacc attctgcaag ctggctgaac aactacaaaa aaggttacgg ctacggtccg     420
tatccgctgg gtattaacgg cggtaatcat tatggcgtcg atttctttat gaatgttggc     480
acaccggtcc gcgcaattag cgatggtaaa atcgttgaag ccggctggac gaactatggc     540
ggtggcaatg aaatcggtct ggtggaaaac gatggcgttc atcgccagtg gtacatgcat     600
ctgagcaaat tcaacgtgaa agttggtgat cgtgtgaaag caggccagat tatcggctgg     660
tcaggttcta caggctattc aacggccccg catctgcatt ttcagcgtat gacgaacagc     720
ttttcaaata caccgcgca ggatccgatg ccgtttctga atcagcagg ctatggttct      780
aacagcacca gctcatctaa caacaacggt tacaaaacca caaatacgg cacactgtac     840
aaatcagaat ctgccagctt taccgcgaat acagatatta tcacgcgcct gaccggcccg     900
```

```
tttcgttcaa tgccgcagtc tggtgttctg cgcaaaggcc tgaccatcaa atacgatgaa      960
gtcatgaaac aggatggtca tgtctgggtg ggctataaca caaatagcgg caaacgtgtt     1020
tatctgccgg taagaacttg aatgaatca acgggagaac tgggtccgct gtggggaaca     1080
atcaaataa                                                             1089
```

<210> SEQ ID NO 8
<211> LENGTH: 327
<212> TYPE: PRT
<213> ORGANISM: Staphylococcus capitis
<220> FEATURE:
<223> OTHER INFORMATION: ALE-1 glycylglycine endopeptidase (ALE-1) mature protein

<400> SEQUENCE: 8

```
Ser Thr Lys Val Asp Ala Pro Lys Val Glu Gln Glu Ala Pro Ala Lys
1               5                   10                  15

Ala Asp Ala Pro Lys Val Glu Gln Glu Ala Pro Ala Lys Ala Asp Ala
            20                  25                  30

Pro Lys Val Glu Gln Glu Ala Pro Ala Lys Val Asp Ala Pro Lys Val
        35                  40                  45

Glu Gln Glu Ala Pro Ala Lys Val Asp Ala Pro Lys Val Glu Gln Glu
    50                  55                  60

Ala Pro Ala Lys Ala Asp Ala Pro Lys Val Glu Gln Lys Arg Thr Phe
65                  70                  75                  80

Val Arg Glu Ala Ala Gln Ser Asn His Ser Ala Ser Trp Leu Asn Asn
                85                  90                  95

Tyr Lys Lys Gly Tyr Gly Tyr Gly Pro Tyr Pro Leu Gly Ile Asn Gly
            100                 105                 110

Gly Asn His Tyr Gly Val Asp Phe Phe Met Asn Val Gly Thr Pro Val
        115                 120                 125

Arg Ala Ile Ser Asp Gly Lys Ile Val Glu Ala Gly Trp Thr Asn Tyr
    130                 135                 140

Gly Gly Gly Asn Glu Ile Gly Leu Val Glu Asn Asp Gly Val His Arg
145                 150                 155                 160

Gln Trp Tyr Met His Leu Ser Lys Phe Asn Val Lys Val Gly Asp Arg
                165                 170                 175

Val Lys Ala Gly Gln Ile Ile Gly Trp Ser Gly Ser Thr Gly Tyr Ser
            180                 185                 190

Thr Ala Pro His Leu His Phe Gln Arg Met Thr Asn Ser Phe Ser Asn
        195                 200                 205

Asn Thr Ala Gln Asp Pro Met Pro Phe Leu Lys Ser Ala Gly Tyr Gly
    210                 215                 220

Ser Asn Ser Thr Ser Ser Asn Asn Gly Tyr Lys Thr Asn Lys
225                 230                 235                 240

Tyr Gly Thr Leu Tyr Lys Ser Glu Ser Ala Ser Phe Thr Ala Asn Thr
                245                 250                 255

Asp Ile Ile Thr Arg Leu Thr Gly Pro Phe Arg Ser Met Pro Gln Ser
            260                 265                 270

Gly Val Leu Arg Lys Gly Leu Thr Ile Lys Tyr Asp Glu Val Met Lys
        275                 280                 285

Gln Asp Gly His Val Trp Val Gly Tyr Asn Thr Asn Ser Gly Lys Arg
    290                 295                 300

Val Tyr Leu Pro Val Arg Thr Trp Asn Glu Ser Thr Gly Glu Leu Gly
305                 310                 315                 320
```

Pro Leu Trp Gly Thr Ile Lys
           325

<210> SEQ ID NO 9
<211> LENGTH: 35
<212> TYPE: DNA
<213> ORGANISM: Artificial
<220> FEATURE:
<223> OTHER INFORMATION: BLP_S237signal_F

<400> SEQUENCE: 9
gaaggaaaca ctcgtatgaa aaaaatctca aaagc                                 35

<210> SEQ ID NO 10
<211> LENGTH: 36
<212> TYPE: DNA
<213> ORGANISM: Artificial
<220> FEATURE:
<223> OTHER INFORMATION: BLP_S237signal_R

<400> SEQUENCE: 10
aactagttta atagattagt tcggtccagg attcac                                36

<210> SEQ ID NO 11
<211> LENGTH: 32
<212> TYPE: DNA
<213> ORGANISM: Artificial
<220> FEATURE:
<223> OTHER INFORMATION: vector-F

<400> SEQUENCE: 11
tctattaaac tagttatagg gttatctaaa gg                                    32

<210> SEQ ID NO 12
<211> LENGTH: 21
<212> TYPE: DNA
<213> ORGANISM: Artificial
<220> FEATURE:
<223> OTHER INFORMATION: vector-sig-R

<400> SEQUENCE: 12
acgagtgttt ccttctgctg c                                                21

<210> SEQ ID NO 13
<211> LENGTH: 35
<212> TYPE: DNA
<213> ORGANISM: Artificial
<220> FEATURE:
<223> OTHER INFORMATION: delta-S237N_fw

<400> SEQUENCE: 13
tgcagcaatg aaaaaaatct caaaagctgg tctgg                                 35

<210> SEQ ID NO 14
<211> LENGTH: 28
<212> TYPE: DNA
<213> ORGANISM: Artificial
<220> FEATURE:
<223> OTHER INFORMATION: delta-S237N_rv

<400> SEQUENCE: 14
tttttcattg ctgcaagagc tgccggaa                                         28

<210> SEQ ID NO 15
<211> LENGTH: 30
<212> TYPE: DNA

```
<213> ORGANISM: Artificial
<220> FEATURE:
<223> OTHER INFORMATION: LasA_F

<400> SEQUENCE: 15
gcagctcttg cagcacatga tgatggcctg                                        30

<210> SEQ ID NO 16
<211> LENGTH: 45
<212> TYPE: DNA
<213> ORGANISM: Artificial
<220> FEATURE:
<223> OTHER INFORMATION: LasA_CR

<400> SEQUENCE: 16
tagtttaata gattagtggt ggtggtggtg cagagccagt cccgg                       45

<210> SEQ ID NO 17
<211> LENGTH: 35
<212> TYPE: DNA
<213> ORGANISM: Artificial
<220> FEATURE:
<223> OTHER INFORMATION: pHY_just_F

<400> SEQUENCE: 17
taatctatta aactagttat agggttatct aaagg                                  35

<210> SEQ ID NO 18
<211> LENGTH: 21
<212> TYPE: DNA
<213> ORGANISM: Artificial
<220> FEATURE:
<223> OTHER INFORMATION: pHY_just_R_NEW

<400> SEQUENCE: 18
tgctgcaaga gctgccggaa a                                                 21

<210> SEQ ID NO 19
<211> LENGTH: 35
<212> TYPE: DNA
<213> ORGANISM: Artificial
<220> FEATURE:
<223> OTHER INFORMATION: LasA_Chis_n_F

<400> SEQUENCE: 19
taatctatta aactagttat agggttatct aaagg                                  35

<210> SEQ ID NO 20
<211> LENGTH: 22
<212> TYPE: DNA
<213> ORGANISM: Artificial
<220> FEATURE:
<223> OTHER INFORMATION: LasA_Chis_n_R

<400> SEQUENCE: 20
cagagccagt cccggattat ac                                                22

<210> SEQ ID NO 21
<211> LENGTH: 31
<212> TYPE: DNA
<213> ORGANISM: Artificial
<220> FEATURE:
<223> OTHER INFORMATION: 2F

<400> SEQUENCE: 21
ttaggaggta atatgatgtc tcgtccgatc c                                      31
```

```
<210> SEQ ID NO 22
<211> LENGTH: 45
<212> TYPE: DNA
<213> ORGANISM: Artificial
<220> FEATURE:
<223> OTHER INFORMATION: 2R_bacillus-Chis

<400> SEQUENCE: 22
aactagttta atagattagt ggtggtggtg gtggtcgatt ccgtt            45

<210> SEQ ID NO 23
<211> LENGTH: 33
<212> TYPE: DNA
<213> ORGANISM: Artificial
<220> FEATURE:
<223> OTHER INFORMATION: vector-R

<400> SEQUENCE: 23
catattacct cctaaatatt tttaaagtaa ttg                         33

<210> SEQ ID NO 24
<211> LENGTH: 30
<212> TYPE: DNA
<213> ORGANISM: Artificial
<220> FEATURE:
<223> OTHER INFORMATION: pHY-like6-just-F

<400> SEQUENCE: 24
gcagctcttg cagcagcggc acagtctaac                             30

<210> SEQ ID NO 25
<211> LENGTH: 45
<212> TYPE: DNA
<213> ORGANISM: Artificial
<220> FEATURE:
<223> OTHER INFORMATION: pHY-like6-just-CHisR

<400> SEQUENCE: 25
tagtttaata gattagtggt ggtggtggtg tttgattgtt cccca            45

<210> SEQ ID NO 26
<211> LENGTH: 435
<212> TYPE: PRT
<213> ORGANISM: Bacillus sp. modified KSM-KP43

<400> SEQUENCE: 26
```

Asn Asp Val Ala Arg Gly Ile Val Lys Ala Asp Val Ala Gln Ser Ser
1               5                   10                  15

Tyr Gly Leu Tyr Gly Gln Gly Gln Ile Val Ala Val Ala Asp Thr Gly
            20                  25                  30

Leu Asp Thr Gly Arg Asn Asp Ser Ser Met His Glu Ala Phe Arg Gly
        35                  40                  45

Lys Ile Thr Ala Leu Tyr Ala Leu Gly Arg Thr Asn Asn Ala Asn Asp
    50                  55                  60

Pro Asn Gly His Gly Thr His Val Ala Gly Ser Val Leu Gly Asn Gly
65                  70                  75                  80

Ser Thr Asn Lys Gly Met Ala Pro Gln Ala Asn Leu Val Phe Gln Ser
                85                  90                  95

Ile Met Asp Ser Gly Gly Gly Leu Gly Gly Leu Pro Ser Asn Leu Gln
            100                 105                 110

Thr Leu Phe Ser Gln Ala Tyr Ser Ala Gly Ala Arg Ile His Thr Asn

```
            115                 120                 125
Ser Trp Gly Ala Ser Ser Thr Asn Gly Ala Tyr Thr Thr Asp Ser Arg
    130                 135                 140

Asn Val Asp Asp Tyr Val Arg Lys Asn Asp Met Thr Ile Leu Phe Ala
145                 150                 155                 160

Ala Gly Asn Glu Gly Pro Gly Val Gly Thr Ile Ser Ala Pro Gly Thr
            165                 170                 175

Ala Lys Asn Ala Ile Thr Val Gly Ala Thr Glu Asn Leu Arg Pro Ser
            180                 185                 190

Phe Gly Ser Gln Ala Asp Asn Ile Asn His Val Ala Gln Phe Ser Ser
            195                 200                 205

Arg Gly Pro Thr Lys Asp Gly Arg Ile Lys Pro Asp Val Met Ala Pro
    210                 215                 220

Gly Thr Phe Ile Leu Ser Ala Arg Ser Ser Leu Ala Pro Asp Ser Ser
225                 230                 235                 240

Phe Trp Ala Asn His Asp Ser Lys Tyr Ala Tyr Met Gly Gly Thr Ser
            245                 250                 255

Met Ile Thr Pro Ile Val Ala Gly Asn Val Ala Gln Leu Arg Glu His
            260                 265                 270

Phe Ile Lys Asn Arg Gly Ile Thr Pro Lys Pro Ser Leu Leu Lys Ala
            275                 280                 285

Ala Leu Ile Ala Gly Ala Ala Asp Ile Gly Leu Gly Tyr Pro Asn Gly
            290                 295                 300

Asn Gln Gly Trp Gly Arg Val Thr Leu Asp Lys Ser Leu Asn Val Ala
305                 310                 315                 320

Tyr Val Asn Glu Ser Ser Ser Leu Ser Thr Ser Gln Lys Ala Thr Tyr
                325                 330                 335

Ser Phe Thr Ala Thr Ala Gly Lys Pro Leu Lys Ile Ser Leu Val Trp
            340                 345                 350

Ser Asp Ala Pro Ala Ser Thr Ser Ala Ser Val Thr Leu Val Asn Asp
            355                 360                 365

Leu Asn Leu Val Ile Thr Ala Pro Asn Gly Thr Gln Tyr Val Gly Asn
    370                 375                 380

Asp Phe Thr Ala Pro Tyr Asn Asp Asn Trp Asp Gly Arg Asn Asn Val
385                 390                 395                 400

Glu Asn Val Phe Ile Asn Ala Pro Gln Ser Gly Thr Tyr Thr Ile Glu
                405                 410                 415

Val Gln Ala Tyr Asn Val Pro Val Gly Pro Gln Thr Phe Ser Leu Ala
            420                 425                 430

Ile Val Asn
        435

<210> SEQ ID NO 27
<211> LENGTH: 269
<212> TYPE: PRT
<213> ORGANISM: Bacillus sp. K-16

<400> SEQUENCE: 27

Ala Gln Ser Val Pro Trp Gly Ile Ser Arg Val Gln Ala Pro Ala Ala
1               5                   10                  15

His Asn Arg Gly Leu Thr Gly Ser Gly Val Lys Val Ala Val Leu Asp
            20                  25                  30

Thr Gly Ile Ser Thr His Pro Asp Leu Asn Ile Arg Gly Gly Ala Ser
        35                  40                  45
```

```
Phe Val Pro Gly Glu Pro Ser Thr Gln Asp Gly Asn Gly His Gly Thr
 50                  55                  60

His Val Ala Gly Thr Ile Ala Ala Leu Asn Asn Ser Ile Gly Val Leu
 65                  70                  75                  80

Gly Val Ala Pro Ser Ala Glu Leu Tyr Ala Val Lys Val Leu Gly Ala
                 85                  90                  95

Ser Gly Ser Gly Ser Val Ser Ser Ile Ala Gln Gly Leu Glu Trp Ala
            100                 105                 110

Gly Asn Asn Gly Met His Val Ala Asn Leu Ser Leu Gly Ser Pro Ser
            115                 120                 125

Pro Ser Ala Thr Leu Glu Gln Ala Val Asn Ser Ala Thr Ser Arg Gly
130                 135                 140

Val Leu Val Val Ala Ala Ser Gly Asn Ser Gly Ala Gly Ser Ile Ser
145                 150                 155                 160

Tyr Pro Ala Arg Tyr Ala Asn Ala Met Ala Val Gly Ala Thr Asp Gln
                165                 170                 175

Asn Asn Asn Arg Ala Ser Phe Ser Gln Tyr Gly Ala Gly Leu Asp Ile
            180                 185                 190

Val Ala Pro Gly Val Asn Val Gln Ser Thr Tyr Pro Gly Ser Thr Tyr
            195                 200                 205

Ala Ser Leu Asn Gly Thr Ser Met Ala Thr Pro His Val Ala Gly Val
210                 215                 220

Ala Ala Leu Val Lys Gln Lys Asn Pro Ser Trp Ser Asn Val Gln Ile
225                 230                 235                 240

Arg Asn His Leu Lys Asn Thr Ala Thr Gly Leu Gly Asn Thr Asn Leu
                245                 250                 255

Tyr Gly Ser Gly Leu Val Asn Ala Glu Ala Ala Thr Arg
            260                 265

<210> SEQ ID NO 28
<211> LENGTH: 584
<212> TYPE: PRT
<213> ORGANISM: Homo sapiens
<220> FEATURE:
<223> OTHER INFORMATION: keratin-10

<400> SEQUENCE: 28

Met Ser Val Arg Tyr Ser Ser Ser Lys His Tyr Ser Ser Ser Arg Ser
 1                5                  10                  15

Gly Gly Gly Gly Gly Gly Gly Cys Gly Gly Gly Gly Gly Gly Val Ser
                 20                  25                  30

Ser Leu Arg Ile Ser Ser Ser Lys Gly Ser Leu Gly Gly Gly Phe Ser
             35                  40                  45

Ser Gly Gly Phe Ser Gly Gly Ser Phe Ser Arg Gly Ser Ser Gly Gly
 50                  55                  60

Gly Cys Phe Gly Gly Ser Ser Gly Gly Tyr Gly Gly Leu Gly Gly Phe
 65                  70                  75                  80

Gly Gly Gly Ser Phe Arg Gly Ser Tyr Gly Ser Ser Ser Phe Gly Gly
                 85                  90                  95

Ser Tyr Gly Gly Ile Phe Gly Gly Gly Ser Phe Gly Gly Gly Ser Phe
            100                 105                 110

Gly Gly Gly Ser Phe Gly Gly Gly Phe Gly Gly Gly Phe Gly Gly Phe Gly
            115                 120                 125

Gly Gly Phe Gly Gly Gly Phe Gly Gly Asp Gly Gly Leu Leu Ser Gly
            130                 135                 140
```

```
Asn Glu Lys Val Thr Met Gln Asn Leu Asn Asp Arg Leu Ala Ser Tyr
145                 150                 155                 160

Leu Asp Lys Val Arg Ala Leu Glu Glu Ser Asn Tyr Glu Leu Glu Gly
                165                 170                 175

Lys Ile Lys Glu Trp Tyr Glu Lys His Gly Asn Ser His Gln Gly Glu
            180                 185                 190

Pro Arg Asp Tyr Ser Lys Tyr Lys Thr Ile Asp Asp Leu Lys Asn
            195                 200                 205

Gln Ile Leu Asn Leu Thr Thr Asp Asn Ala Asn Ile Leu Leu Gln Ile
        210                 215                 220

Asp Asn Ala Arg Leu Ala Ala Asp Asp Phe Arg Leu Lys Tyr Glu Asn
225                 230                 235                 240

Glu Val Ala Leu Arg Gln Ser Val Glu Ala Asp Ile Asn Gly Leu Arg
                245                 250                 255

Arg Val Leu Asp Glu Leu Thr Leu Thr Lys Ala Asp Leu Glu Met Gln
            260                 265                 270

Ile Glu Ser Leu Thr Glu Glu Leu Ala Tyr Leu Lys Lys Asn His Glu
        275                 280                 285

Glu Glu Met Lys Asp Leu Arg Asn Val Ser Thr Gly Asp Val Asn Val
290                 295                 300

Glu Met Asn Ala Ala Pro Gly Val Asp Leu Thr Gln Leu Leu Asn Asn
305                 310                 315                 320

Met Arg Ser Gln Tyr Glu Gln Leu Ala Glu Gln Asn Arg Lys Asp Ala
                325                 330                 335

Glu Ala Trp Phe Asn Glu Lys Ser Lys Glu Leu Thr Thr Glu Ile Asp
            340                 345                 350

Asn Asn Ile Glu Gln Ile Ser Ser Tyr Lys Ser Glu Ile Thr Glu Leu
        355                 360                 365

Arg Arg Asn Val Gln Ala Leu Glu Ile Glu Leu Gln Ser Gln Leu Ala
370                 375                 380

Leu Lys Gln Ser Leu Glu Ala Ser Leu Ala Glu Thr Glu Gly Arg Tyr
385                 390                 395                 400

Cys Val Gln Leu Ser Gln Ile Gln Ala Gln Ile Ser Ala Leu Glu Glu
                405                 410                 415

Gln Leu Gln Gln Ile Arg Ala Glu Thr Glu Cys Gln Asn Thr Glu Tyr
            420                 425                 430

Gln Gln Leu Leu Asp Ile Lys Ile Arg Leu Glu Asn Glu Ile Gln Thr
        435                 440                 445

Tyr Arg Ser Leu Leu Glu Gly Glu Gly Ser Ser Gly Gly Gly Gly Arg
450                 455                 460

Gly Gly Gly Ser Phe Gly Gly Tyr Gly Gly Ser Ser Gly Gly
465                 470                 475                 480

Gly Ser Ser Gly Gly Gly His Gly Gly His Gly Ser Ser Gly
            485                 490                 495

Gly Gly Tyr Gly Gly Ser Ser Gly Gly Ser Ser Gly Gly Gly
        500                 505                 510

Tyr Gly Gly Ser Ser Gly Gly His Gly Gly Ser Ser Ser Gly
            515                 520                 525

Gly Tyr Gly Gly Ser Ser Gly Gly Gly Gly Tyr Gly Gly
        530                 535                 540

Gly Ser Ser Gly Gly Ser Ser Gly Gly Gly Tyr Gly Gly Gly
545                 550                 555                 560

Ser Ser Ser Gly Gly His Lys Ser Ser Ser Gly Ser Val Gly Glu
```

Ser Ser Ser Lys Gly Pro Arg Tyr
            580

<210> SEQ ID NO 29
<211> LENGTH: 316
<212> TYPE: PRT
<213> ORGANISM: Homo sapiens
<220> FEATURE:
<223> OTHER INFORMATION: loricrine

<400> SEQUENCE: 29

Met Ser Tyr Gln Lys Lys Gln Pro Thr Pro Gln Pro Val Asp Cys
1               5                   10                  15

Val Lys Thr Ser Gly Gly Gly Gly Gly Gly Gly Gly Gly Gly Gly
            20                  25                  30

Gly Cys Gly Phe Phe Gly Gly Gly Ser Gly Gly Ser Ser Gly
            35                  40                  45

Ser Gly Cys Gly Tyr Ser Gly Gly Gly Tyr Ser Gly Gly Gly Cys
        50                  55                  60

Gly Gly Gly Ser Gly Gly Gly Gly Gly Gly Ile Gly Cys
65                  70                  75                  80

Gly Gly Gly Ser Gly Gly Ser Val Lys Tyr Ser Gly Gly Gly Ser
                85                  90                  95

Ser Gly Gly Gly Ser Gly Cys Phe Ser Ser Gly Gly Gly Ser Gly
                100                 105                 110

Cys Phe Ser Ser Gly Gly Gly Ser Ser Gly Gly Ser Gly Cys
            115                 120                 125

Phe Ser Ser Gly Gly Gly Gly Ser Ser Gly Gly Gly Ser Gly Cys Phe
            130                 135                 140

Ser Ser Gly Gly Gly Gly Phe Ser Gly Gln Ala Val Gln Cys Gln Ser
145                 150                 155                 160

Tyr Gly Gly Val Ser Ser Gly Gly Ser Gly Gly Gly Ser Gly Cys
                165                 170                 175

Phe Ser Ser Gly Gly Gly Gly Gly Ser Val Cys Gly Tyr Ser Gly Gly
            180                 185                 190

Gly Ser Gly Gly Gly Ser Gly Cys Gly Gly Gly Ser Ser Gly Gly Ser
        195                 200                 205

Gly Ser Gly Tyr Val Ser Ser Gln Gln Val Thr Gln Thr Ser Cys Ala
        210                 215                 220

Pro Gln Pro Ser Tyr Gly Gly Gly Ser Ser Gly Gly Gly Gly Ser Gly
225                 230                 235                 240

Gly Ser Gly Cys Phe Ser Ser Gly Gly Gly Gly Ser Ser Gly Cys
            245                 250                 255

Gly Gly Gly Ser Ser Gly Ile Gly Ser Gly Cys Ile Ile Ser Gly Gly
            260                 265                 270

Gly Ser Val Cys Gly Gly Gly Ser Ser Gly Gly Gly Gly Ser
            275                 280                 285

Ser Val Gly Gly Ser Gly Ser Gly Lys Gly Val Pro Ile Cys His Gln
        290                 295                 300

Thr Gln Gln Lys Gln Ala Pro Thr Trp Pro Ser Lys
305                 310                 315

<210> SEQ ID NO 30
<211> LENGTH: 5
<212> TYPE: PRT

```
<213> ORGANISM: Artificial
<220> FEATURE:
<223> OTHER INFORMATION: reference peptide

<400> SEQUENCE: 30

Gly Gly Gly Gly Gly
1               5

<210> SEQ ID NO 31
<211> LENGTH: 4
<212> TYPE: PRT
<213> ORGANISM: Artificial
<220> FEATURE:
<223> OTHER INFORMATION: reference peptide

<400> SEQUENCE: 31

Gly Gly Gly Gly
1

<210> SEQ ID NO 32
<211> LENGTH: 5
<212> TYPE: PRT
<213> ORGANISM: Artificial
<220> FEATURE:
<223> OTHER INFORMATION: substrate peptide

<400> SEQUENCE: 32

Gly Gly Gly Ser Gly
1               5

<210> SEQ ID NO 33
<211> LENGTH: 5
<212> TYPE: PRT
<213> ORGANISM: Artificial
<220> FEATURE:
<223> OTHER INFORMATION: substrate peptide

<400> SEQUENCE: 33

Gly Gly Gly Tyr Gly
1               5

<210> SEQ ID NO 34
<211> LENGTH: 5
<212> TYPE: PRT
<213> ORGANISM: Artificial
<220> FEATURE:
<223> OTHER INFORMATION: substrate peptide

<400> SEQUENCE: 34

Gly Gly Gly Leu Gly
1               5

<210> SEQ ID NO 35
<211> LENGTH: 5
<212> TYPE: PRT
<213> ORGANISM: Artificial
<220> FEATURE:
<223> OTHER INFORMATION: substrate peptide

<400> SEQUENCE: 35

Gly Gly Gly Phe Gly
1               5
```